(12) United States Patent
Siminis

(10) Patent No.: US 8,529,320 B2
(45) Date of Patent: Sep. 10, 2013

(54) APPARATUS FOR SHUCKING OYSTERS

(76) Inventor: Michael Steven Siminis, Sadleir (AU)

(*) Notice: Subject to any disclaimer, the term of this patent is extended or adjusted under 35 U.S.C. 154(b) by 603 days.

(21) Appl. No.: 12/799,422

(22) Filed: Apr. 22, 2010

(65) Prior Publication Data

US 2010/0304650 A1 Dec. 2, 2010

(51) Int. Cl.
*A22C 29/04* (2006.01)
(52) U.S. Cl.
USPC ............................................. 452/13
(58) Field of Classification Search
USPC ................. 452/12, 13, 16, 17, 102–105
See application file for complete search history.

(56) References Cited

U.S. PATENT DOCUMENTS

| | | | | |
|---|---|---|---|---|
| 3,748,692 A | * | 7/1973 | Valentino | 452/16 |
| 5,427,567 A | * | 6/1995 | Adcock | 452/13 |
| 8,109,810 B2 | * | 2/2012 | Blenkinsopp et al. | 452/16 |

* cited by examiner

*Primary Examiner* — Richard Price, Jr.
(74) *Attorney, Agent, or Firm* — Abelman, Frayne & Schwab

(57) ABSTRACT

An apparatus (270) for shucking oysters includes a shucking head (272) adapted to be mounted on a mounting assembly. The shucking head includes means for supporting the oyster in a position so that a lower shell of the oyster is supported on a pair of arms (282, 284) of support members (274, 276). The shucking head also includes means for wedging the oyster in a position so that an end of the oyster is wedged against a selected wedging member (278, 280). The arrangement of support members and wedging members is such that the oyster is held in a stable position to allow a person to use a knife to shuck the oyster with one hand.

16 Claims, 32 Drawing Sheets

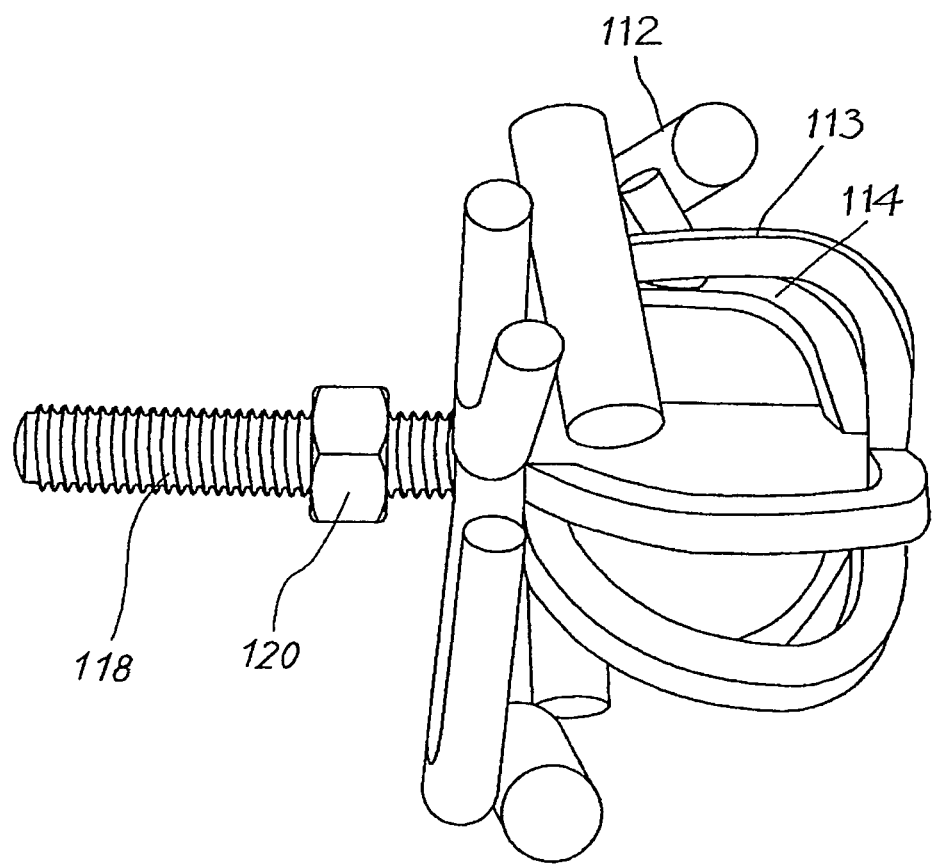

APPARATUS FOR SHUCKING OYSTERS

FIELD OF THE INVENTION

The present invention relates to apparatus for shucking oysters and, in particular, to an apparatus for holding an oyster in a stable position that improves the performance of a person using a knife to shuck the oyster.

BACKGROUND ART

The conventional approach to shucking or opening the closed shells of an oyster to access the organism therewithin has been to use one hand to hold the oyster and another hand to hold a knife that is used to separate one shell from the other and, in most cases, to separate the organism from the muscle that fixes it to one of the shells. This is normally achieved by causing the tip of the knife blade to penetrate the weakest point of the unopened oyster which is at the location of the valve, manipulating the position of the knife to separate the upper and lower shells, and then sweeping the blade of the knife along one side of the oyster between the shells to sever the muscle, whereby the oyster is opened and taken to the next stage of its processing. After this process of shucking the oyster, a stream of water is allowed to fall over the hands, knife, and oyster to remove any shell debris or other material that may contaminate the finished product.

Such a process has been found to have problems, not the least of which is that it often results in blisters and other injuries to the worker, thereby decreasing their overall speed of performance and their level of productivity. Blisters and other injuries, such as cuts, may lead to the release of blood from the worker and the blood may contaminate the oyster and render unhygienic the working environment. Furthermore, the use of bench space in such a process also increases the likelihood of poor hygiene.

Not only are there injuries and hygiene factors that need to be considered, but the conventional manual process is also costly. The process has often damaged the finished product and so resulted in a diminished commercial value for the oysters. Water is also wasted in the course of washing away any human blood or debris from a damaged oyster.

It is another problem with the conventional process that it involves repetitive hand movements which can often lead to joint and muscular problems, particularly of the wrist. Repetitive strain injuries are not uncommon among such workers, and there is the risk of a worker's compensation claim being filed.

All of these problems impose a significant cost burden on a business, involved in the shucking of oysters.

SUMMARY OF THE INVENTION

It is, therefore, an object of the present invention to overcome, or at least to substantially ameliorate, the disadvantages and shortcomings of the aforementioned prior art process.

It is another object of the present invention to provide an apparatus for shucking oysters that removes the need to use one hand to hold an oyster during the shucking process and so avoids certain injuries that may result from a knife held in the other hand injuring the hand holding the oyster. Not only is the likelihood of injury reduced, but the worker's level of comfort is increased, which results in increased overall speed and level of productivity.

It is yet another object of the present invention to provide an apparatus for shucking oysters that maintains a high level of hygiene and achieves a high commercial value of finished product at low cost of production by removing the need to use bench space and limiting an oyster's contact with blood and debris resulting from the process.

According to the present invention, there is provided an apparatus for shucking oysters comprising one or more shucking head adapted to be mounted on a mounting assembly, the or each shucking head including means for supporting the oyster in a position so that a lower shell of the oyster is supported on one or more support member, and means for wedging the oyster in a position so that an end of the oyster is wedged against one or more wedging member, the arrangement of supporting means and wedging means being such that the oyster is held in a stable position to allow a person to use a knife to shuck the oyster with one hand.

Preferably, there are two support members comprising spaced apart arms, the lower shell of the oyster being supported by the arms at respective opposed sides thereof.

It is preferred that the apparatus includes means for adjusting the position of at least one of the arms so as to accommodate differently sized and shaped oysters.

In one preferred form, the arm position adjusting means comprises a rotatable connection that allows the position of one arm to be rotatably adjusted relative to the position of the other arm.

In another further preferred form, the arm position adjusting means comprises a slidable connection that allows the position of both arms to be slidably adjusted relative to the position of the wedging means.

Preferably, there are a plurality of wedging members comprising spaced apart protrusion surfaces, the end of the oyster being wedged against a selected one of the protrusion surfaces.

Alternatively, there may be one wedging member comprising a protrusion surface, and the apparatus may include means for adjusting the position of the or each protrusion surface so as to accommodate differently sized and shaped oysters.

In a preferred form, the protrusion position adjusting means comprises a slidable connection that allows the position of the or each protrusion surface to be slidably adjusted relative to the position of the or each supporting member.

Preferably, the or each wedging member comprises a plurality of teeth.

Alternatively, the or each wedging member may comprise a plate or a cylindrical bar.

Preferably, there is one shucking head, and the apparatus may include connector means for adjusting the position of the shucking head relative to the mounting assembly so as to accommodate the hand position of the person shucking the oyster or to accommodate differently constructed knives.

Alternatively, there are a plurality of shucking heads forming a multihead, and each shucking head has a pair of support members that are spaced apart from each other and from the or each wedging member by a different distance to that of the or each other shucking head, and the apparatus may include means for adjusting the position of the multihead so as to allow a selected one of the shucking heads to hold the oyster in a stable position.

Preferably, the multihead position adjusting means comprises a rotatable connection that allows the position of the multihead to be rotatably adjusted relative to the position of the mounting assembly.

The apparatus preferably includes means for locating a water dispensing device over the or each shucking head.

It is preferred that the apparatus includes a stand to which the mounting assembly is secured.

In another preferred form, the mounting assembly includes an upright post having a nut fastened at its uppermost end, and a linkage limb having a threaded member received by the nut, the linkage limb being adapted to orientate the one or more shucking head in a stable position.

In a still further preferred form, the linkage limb supports the rotatable connection that allows the position of the multihead to be rotatably adjusted relative to the position of the mounting assembly.

The linkage limb may comprise one or more articulated limb sections to which the or each shucking head is mounted.

SUMMARY OF THE DRAWINGS

In order that the invention may be more readily understood and put into practical effect, reference will now be made to the accompanying drawings, in which:—

BEST MODES OF CARRYING OUT THE INVENTION

Figure 1:
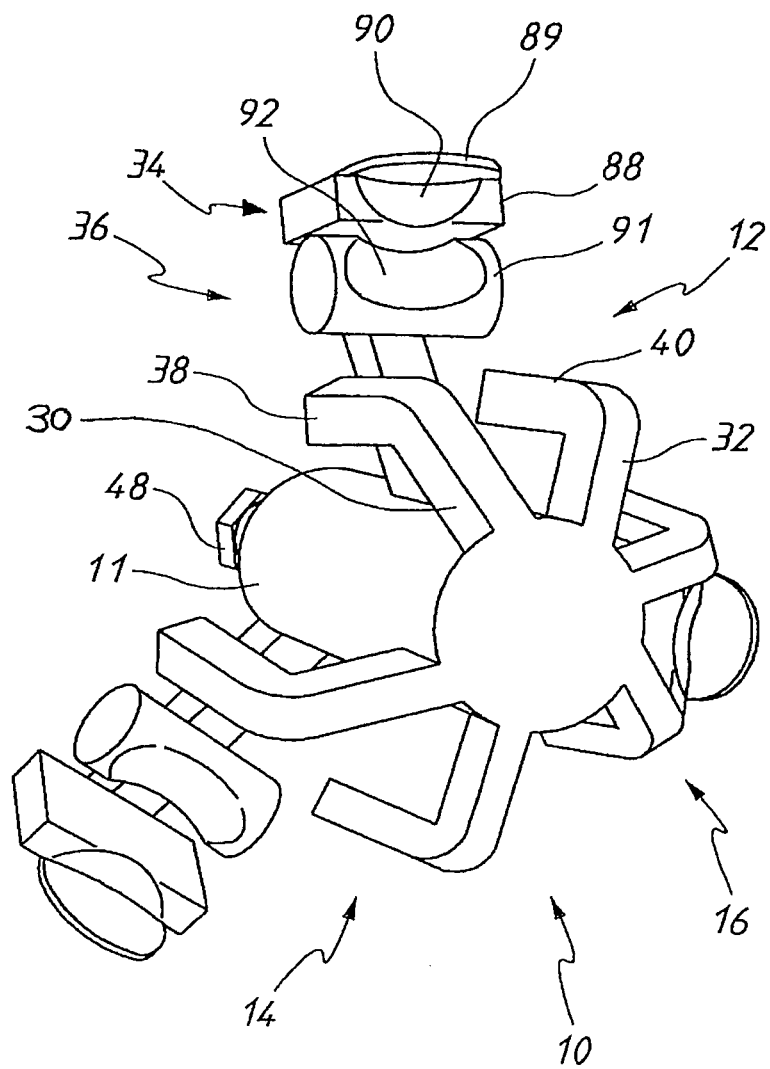
FIG. 1 is a perspective view of an oyster shucking apparatus according to a first preferred embodiment of the invention.
Figure 2:
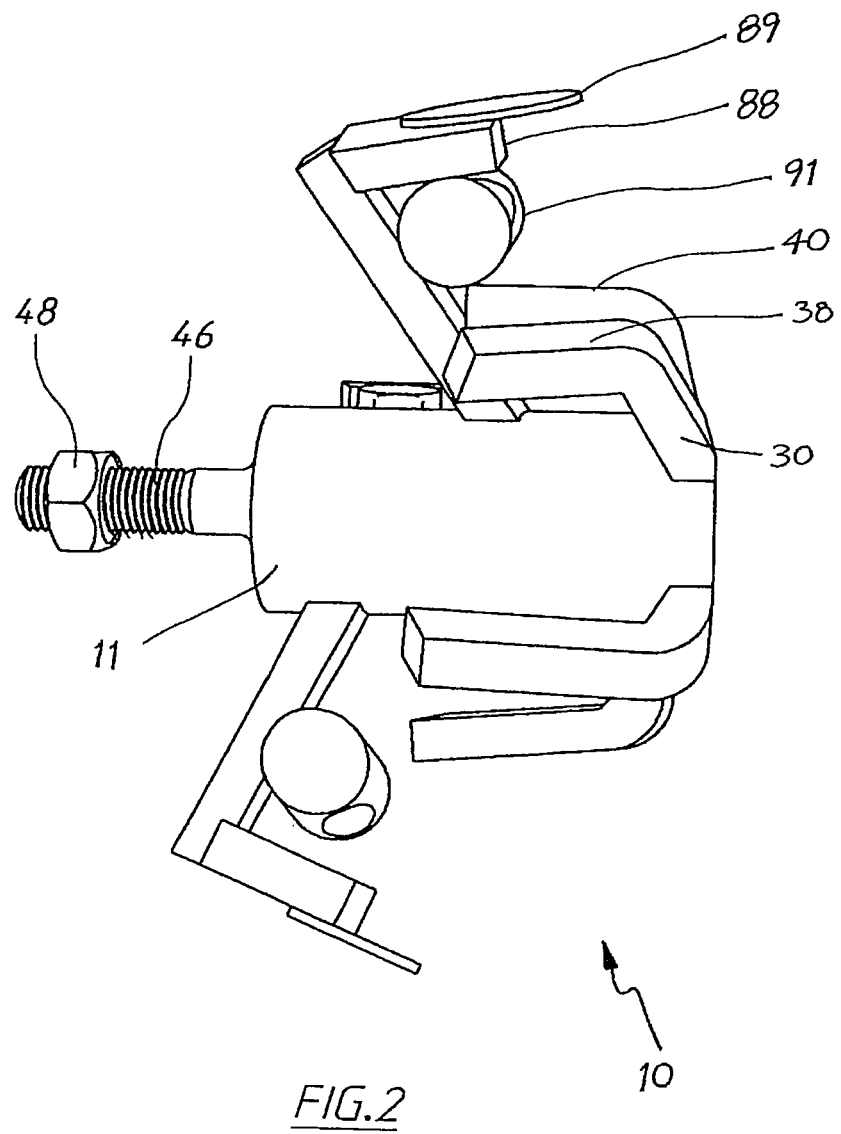
FIG. 2 is a side view of the apparatus of FIG. 1.
Figure 3:
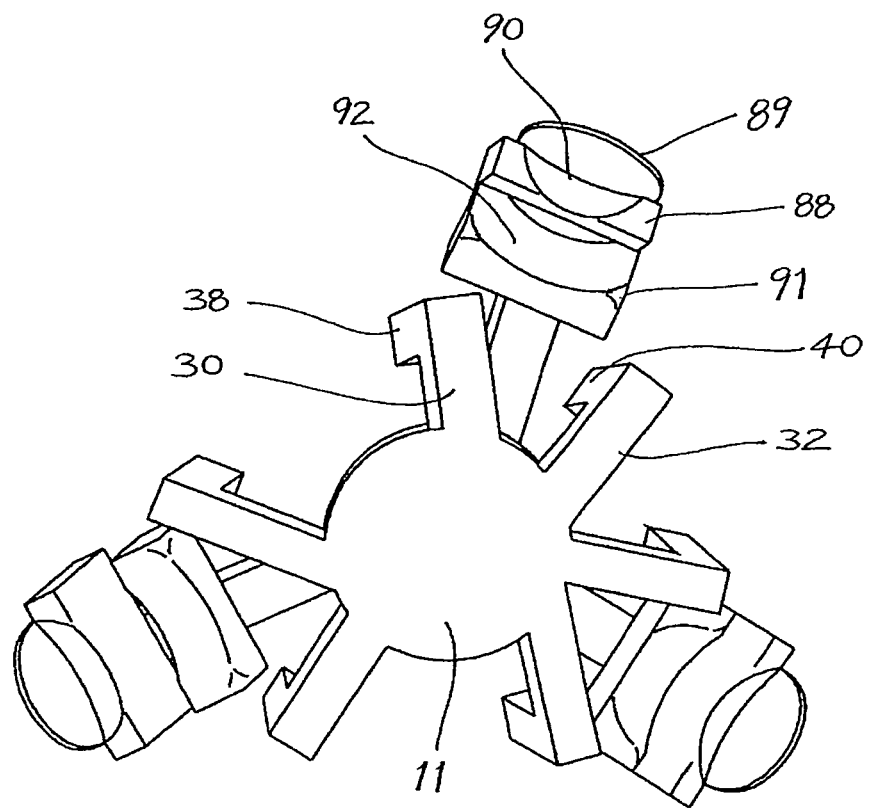
FIG. 3 is a front view of the apparatus of FIG. 1.

The apparatus 10 shown in FIGS. 1 to 3 comprises a body 11 to which is connected a plurality of shucking heads 12, 14, 16, each having oyster supporting means and oyster wedging means. Each oyster supporting means includes two support members 30, 32 and each oyster wedging means includes an arrangement of wedging members 34, 36.

The support members 30, 32 comprise spaced apart arms 38, 40 having generally parallel arm portions adapted to support the lower shell of an oyster at respective opposed sides thereof.

The wedging members 34, 36 comprise spaced apart protrusion surfaces adapted to wedge the end of an oyster against a selected one of the protrusion surfaces. The upper wedging member 34 is a rectangular block 88 with a forwardly extending panel 89 secured to its top and a curved indentation 90 formed in the block beneath the panel. The lower wedging member 36 is in the form of a cylindrical bar 91 also with a curved indentation 92 formed therein. Depending on its size and shape, an oyster may have its end wedged against the underside surface of the panel 89 when pressing on the indentation 90, or against the underside surface of the block 88 when pressing on the indentation 92, or against the underside surface of the cylindrical bar 91.

The apparatus 10 is thus in the form of a multihead.

For each shucking head 12, 14, 16, the arms 38, 40 are spaced apart from each other and from each protrusion surface by a different distance to that of the other two shucking heads. The arrangement of supporting arms 38, 40 and wedging protrusion surfaces is such that an oyster is held in a stable position to allow a person to use a knife to shuck the oyster with one hand.

The position of the multihead apparatus 10 may also be adjusted so as to allow a selected one of the shucking heads 12, 14, 16 to hold the oyster in such a stable position, and so as to accommodate the hand position of the person shucking the oyster or to accommodate differently constructed knives. The position adjusting means, to be described in detail later in the specification, is part of a mounting assembly to which the apparatus 10 is mounted.

The mounting assembly includes a linkage limb, to which can be releasably connected a threaded shaft 46 with nut 48 secured to the rear of the body 11.

Figure 4:
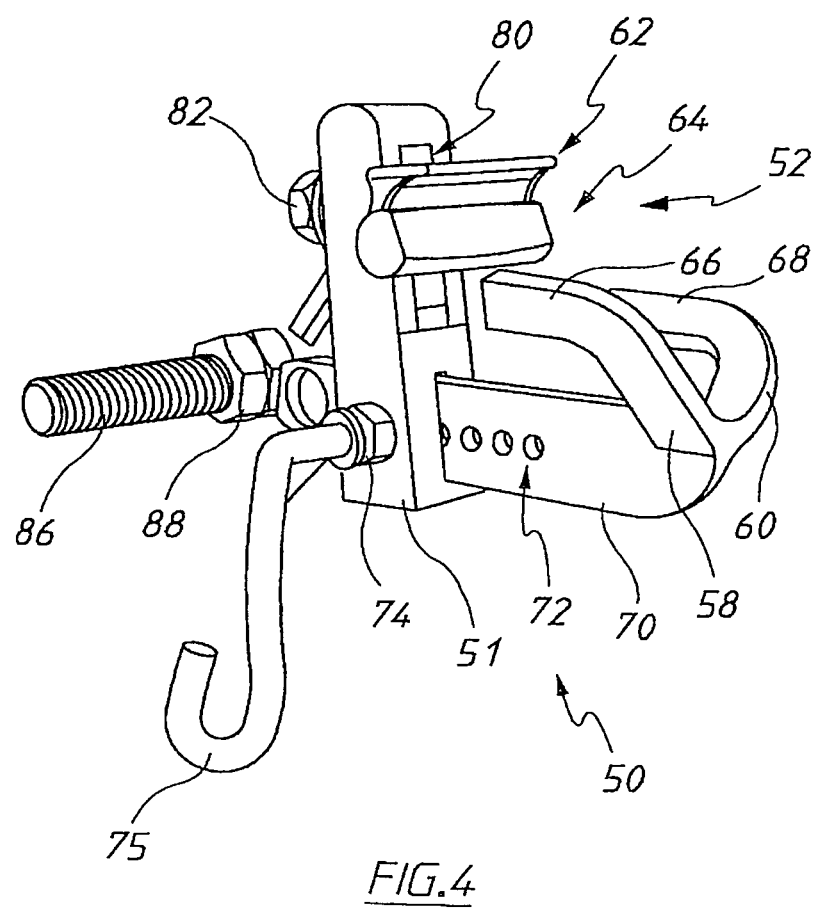
FIG. 4 is a perspective view of an oyster shucking apparatus according to a second preferred embodiment of the invention.
Figure 5:
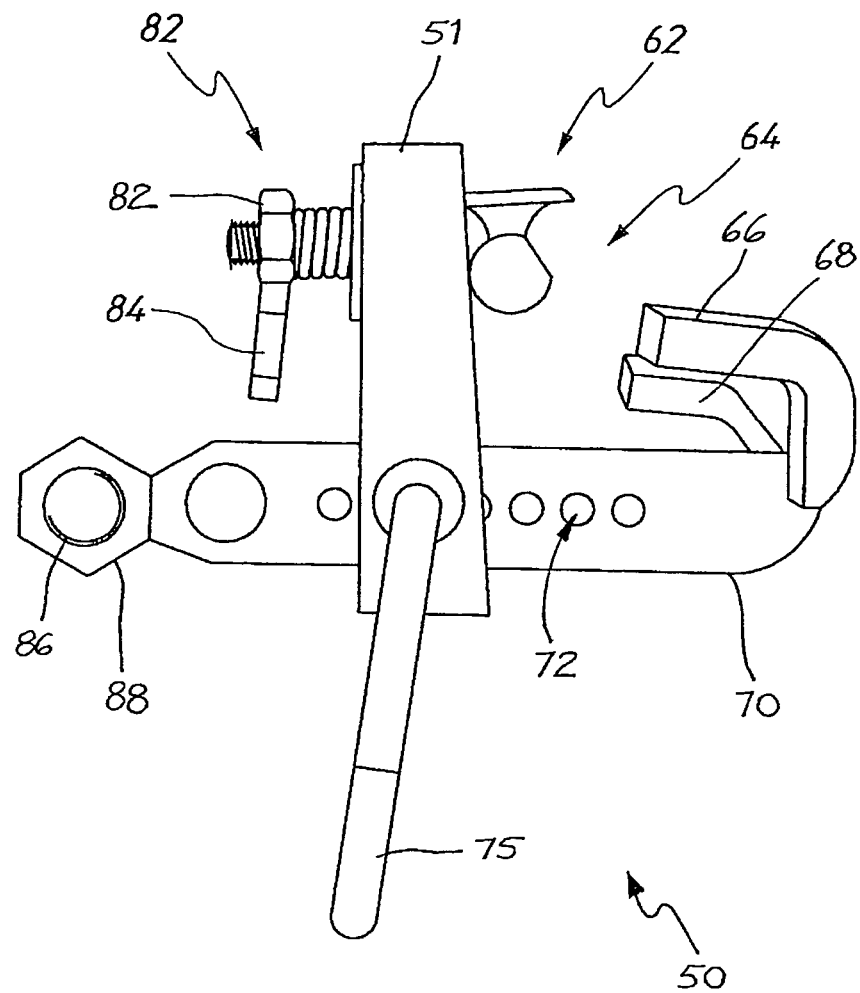
FIG. 5 is a side view of the apparatus of FIG. 2.
Figure 6:
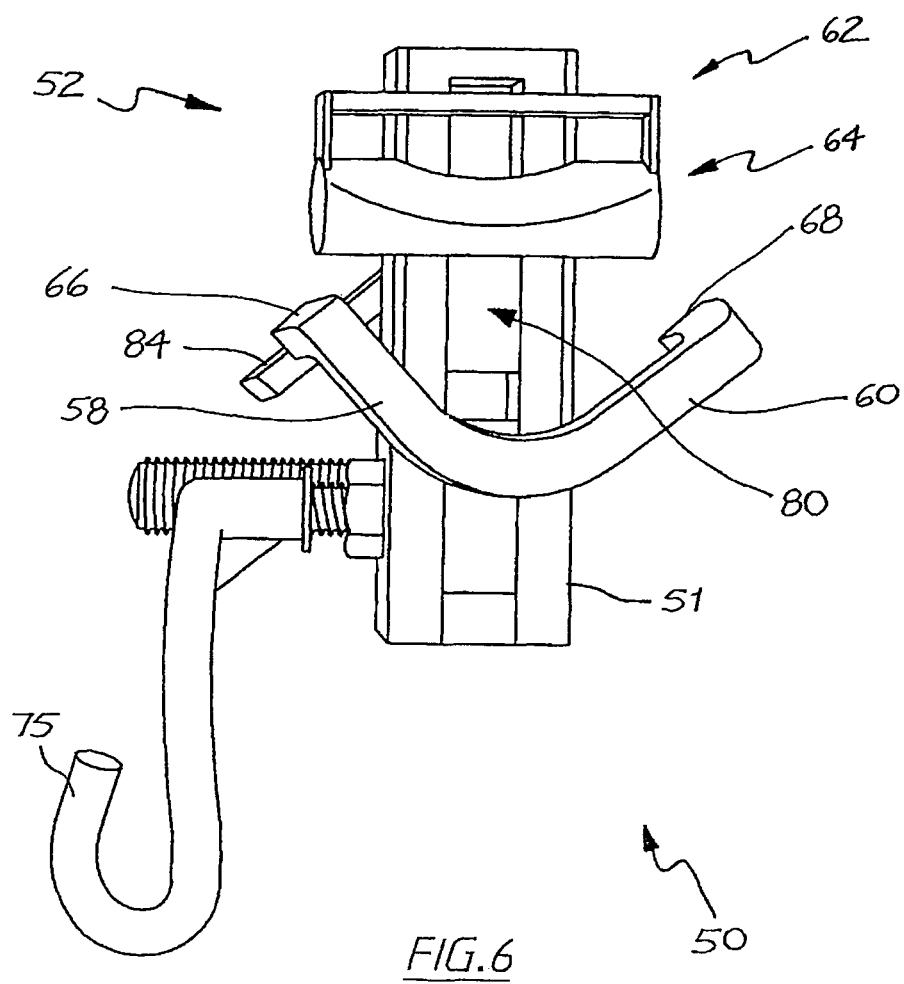
FIG. 6 is a front view of the apparatus of FIG. 2.

The apparatus 50 shown in FIGS. 4 to 6 comprises a body 51 to which is connected a single shucking head 52 having oyster supporting means and oyster wedging means. The oyster supporting means includes two support members 58, 60 and the oyster wedging means includes an arrangement of wedging members 62, 64.

The support members 58, 60 comprise spaced apart arms 66, 68 having generally parallel arm portions adapted to support the lower shell of an oyster at respective opposed sides thereof. The position of the arms 66, 68 may be adjusted by means so as to accommodate differently sized and shaped oysters. The arm position adjusting means comprises a slidable connection between the support members 58, 60 and the body 51 that allows the position of the arms 66, 68 to be slidably adjusted relative to the position of the wedging members 62, 64. The slidable connection includes a slide bar 70 adapted to slide through a passageway in the body 51 and having a plurality of holes 72 that are adapted to be selectively engaged by a shaft of a positioning device 74 that can engage and disengage any one of the holes 72, when in register with the shaft, by a winding motion of a handle 75.

The wedging members 62, 64 comprise spaced apart protrusion surfaces adapted to wedge the end of an oyster against a selected one of the protrusion surfaces. The position of the protrusion surfaces may be adjusted by means so as to accommodate differently sized and shaped oysters. The protrusion position adjusting means comprises a slidable connection between the wedging members 62, 64 and the body 51 that allows the position of the protrusion surfaces to be slidably adjusted relative to the position of the support members 58, 60. The slidable connection includes an open track 80 in the body 51 and a runner (not shown) adapted to slide along the open track 80, the runner being connected to the wedging members 62, 64 at a front end and having a positioning device 82 at the rear end. The positioning device 82 is operably connected to a screw tightening member 84 that can tighten and untighten the device 82 against the wedging members 62, 64 to a selected position along the track 80.

The aforementioned slidable connections allow the arms 66, 68 to be spaced apart from each protrusion surface by a desired distance achieved by slidable adjustment. The arrangement of supporting arms 66, 68 and wedging protrusion surfaces is such that an oyster is held in a stable position to allow a person to use a knife to shuck the oyster with one hand.

Secured to the rear of the slide bar 70 is a threaded shaft 86 with nuts 88, to which can be releasably connected a linkage limb of the mounting assembly.

Figure 7:
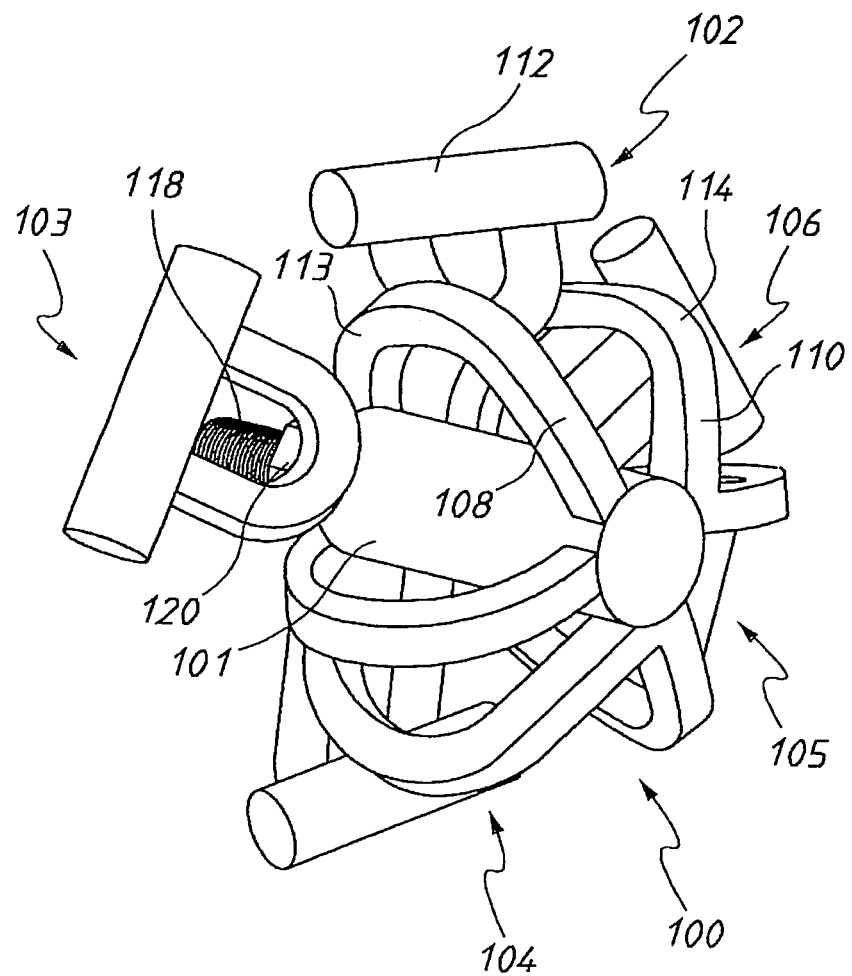
FIG. 7 is a perspective view of an oyster shucking apparatus according to a third preferred embodiment of the invention.
Figure 8:
FIG. 8 is a side view of the apparatus of FIG. 7.
Figure 9:
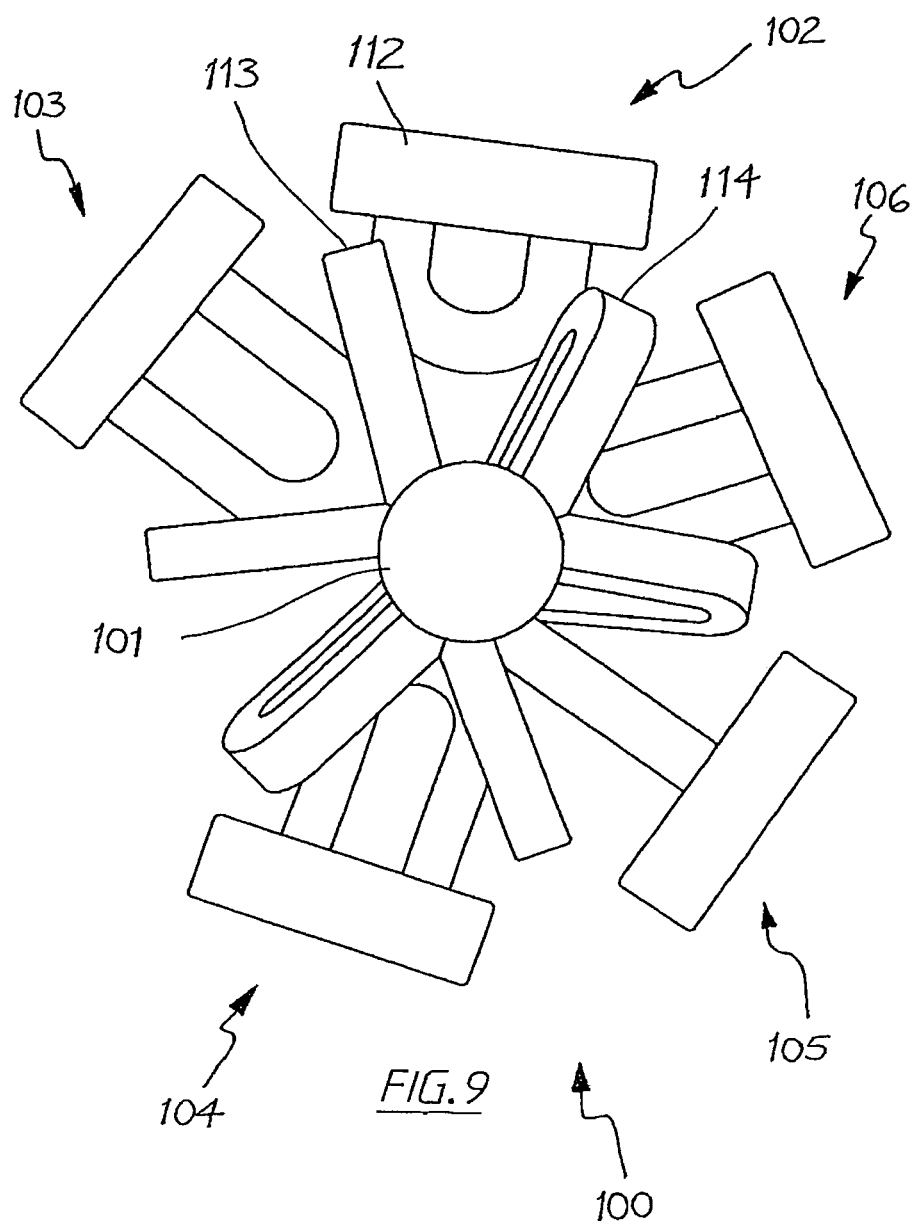
FIG. 9 is a front view of the apparatus of FIG. 7.

The apparatus 100 shown in FIGS. 7 to 9 comprises a body 101 to which is connected a plurality of shucking heads 102, 103, 104, 105, 106, each having oyster supporting means and oyster wedging means. Each oyster supporting means includes two support members 108, 110 and each oyster wedging means includes a wedging member 112. Some of the shucking heads share a support member.

The support members 108, 110 comprise spaced apart arms 113, 114 having bow shaped arm portions adapted to support the lower shell of an oyster at respective opposed sides thereof.

The wedging member 112 comprises a protrusion surface adapted to wedge the end of an oyster thereagainst.

The apparatus 100 is thus in the form of a multihead.

For each shucking head 102 to 106, the arms 113, 114 are spaced apart from each other and from the protrusion surface by a different distance to that of the other shucking heads. The arrangement of supporting arms 113, 114 and wedging protrusion surface is such that an oyster is held in a stable position to allow a person to use a knife to shuck the oyster with one hand.

Secured to the rear of the body 101 is a threaded shaft 118 with nut 120, to which can be releasably connected a linkage limb of the mounting assembly.

Figure 10:
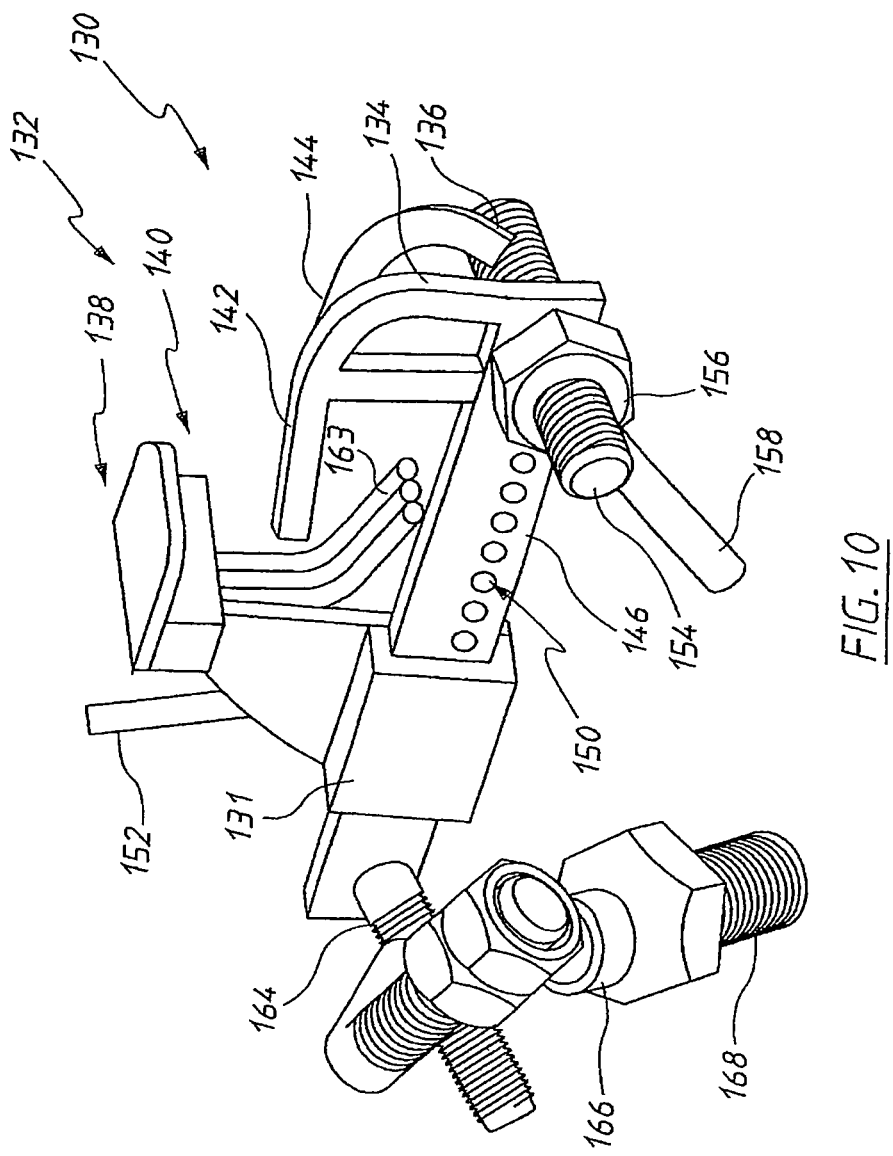
FIG. 10 is a perspective view of an oyster shucking apparatus according to a fourth preferred embodiment of the invention.
Figure 11:
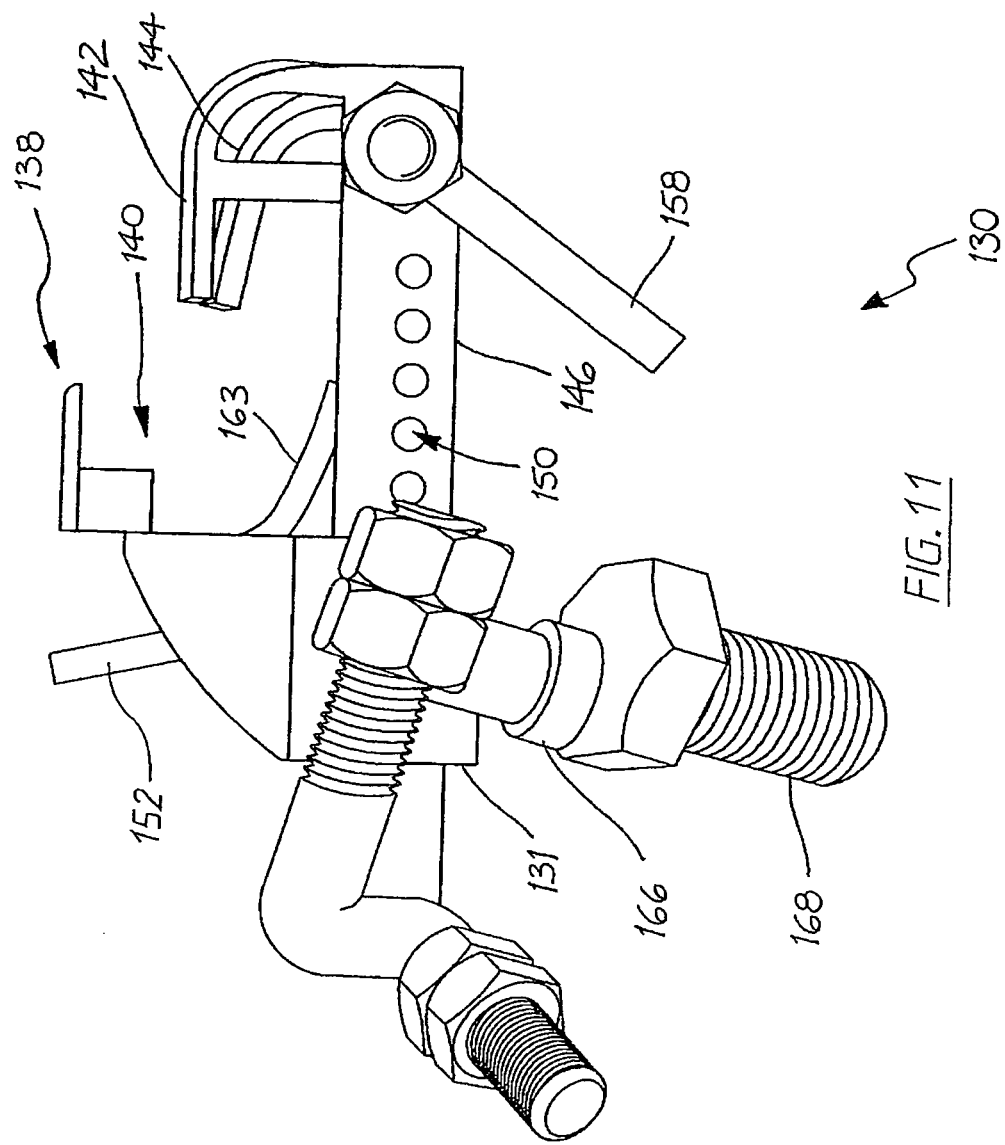
FIG. 11 is a side view of the apparatus of FIG. 10.
Figure 12:
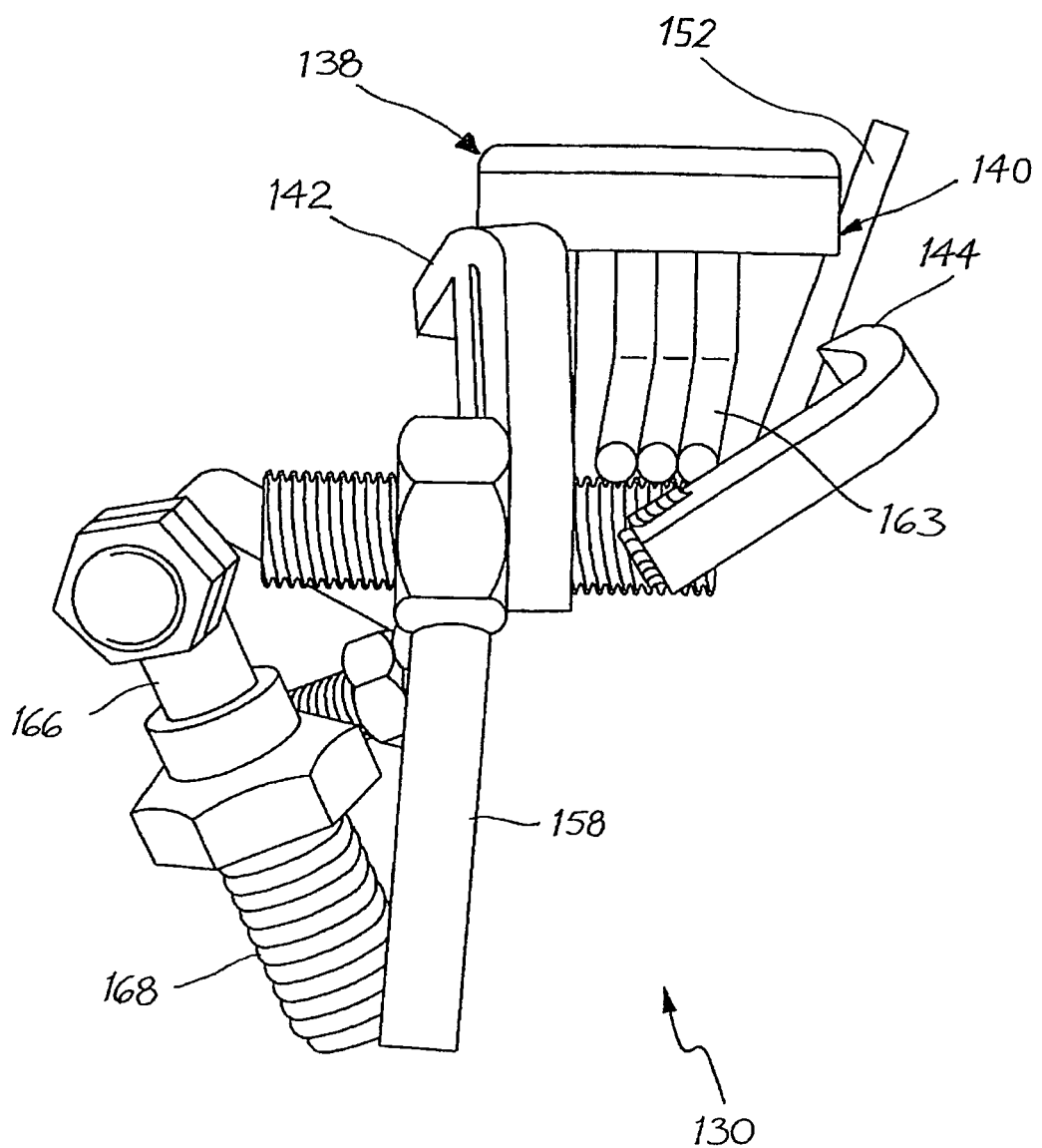
FIG. 12 is a front view of the apparatus of FIG. 10.

The apparatus 130 shown in FIGS. 10 to 12 comprises a body 131 to which is connected a single shucking head 132 having oyster supporting means and oyster wedging means. The oyster supporting means includes two support members 134, 136 and the oyster wedging means includes an arrangement of wedging members 138, 140.

The support members 134, 136 comprise spaced apart arms 142, 144 having offset arm portions adapted to support the lower shell of an oyster at respective opposed sides thereof. The position of the arms 142, 144 may be adjusted by various means so as to accommodate differently sized and shaped oysters. A first arm position adjusting means comprises a slidable connection between the support members 134, 136 and the body 131 that allows the position of the arms 142, 144 to be slidably adjusted relatively to the position of the wedging members 138, 140. The slidable connection includes a slide bar 146 adapted to slide through a passageway in the body 131, and having a plurality of holes 150 that are adapted to be selectively engaged by a shaft of a positioning device 151 that can engage and disengage any one of the holes 150, when in register with the shaft, by a winding motion of a handle 152.

A second arm position adjusting means comprises a rotatable connection between the arms 142, 144 that allows the position of one arm 144 to be rotatably adjusted relative to the position of the other arm 142. The rotatable connection includes a threaded rod 154, to one end of which is secured the arm 144. The rod 154 is adapted to rotate through an aperture in the slide bar 146, to which is secured the arm 142. There is a positioning device 156 which is operably connected to a screw tightening member 158 that can tighten and untighten the device 156 against the arm 144 to a selected position relative to the arm 142.

The wedging members 138, 140 comprise spaced apart protrusion surfaces adapted to wedge the end of an oyster against a selected one of the protrusion surfaces.

Secured at the bottom of the wedging means is a platform 163 that may be used for supporting the underside of an oyster, if necessary.

The arrangement of supporting arms 142, 144 and wedging protrusion surfaces, and supporting platform 163 if necessary, is such that an oyster is held in a stable position to allow a person to use a knife to shuck the oyster with one hand.

Secured to the rear of the slide bar 146 is a threaded mount 164, to which is releasably connected a linkage limb 166 of the mounting assembly. The linkage limb 166 is adapted to orientate the apparatus 130 in a stable position and has a threaded member 168 which can be received by a nut fastened at the uppermost end of an upright post of the mounting assembly.

Figure 13:
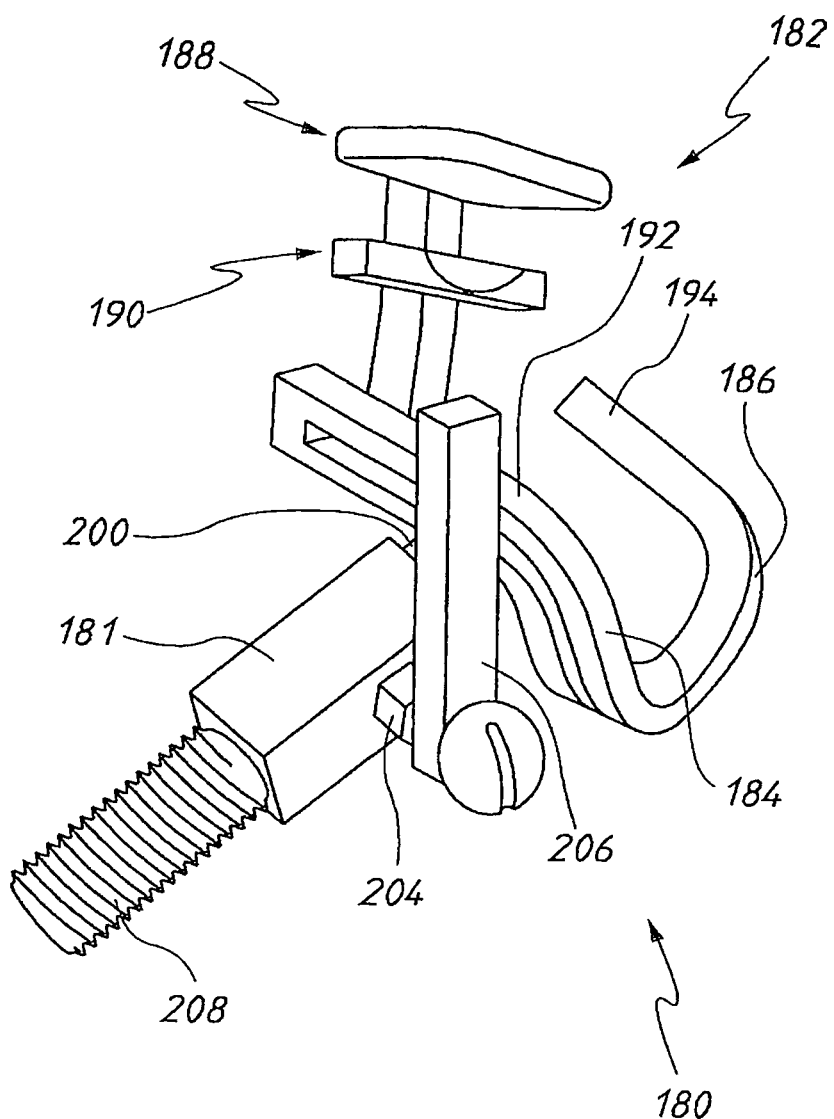
FIG. 13 is a perspective view of an oyster shucking apparatus according to a fifth preferred embodiment of the invention.
Figure 14:
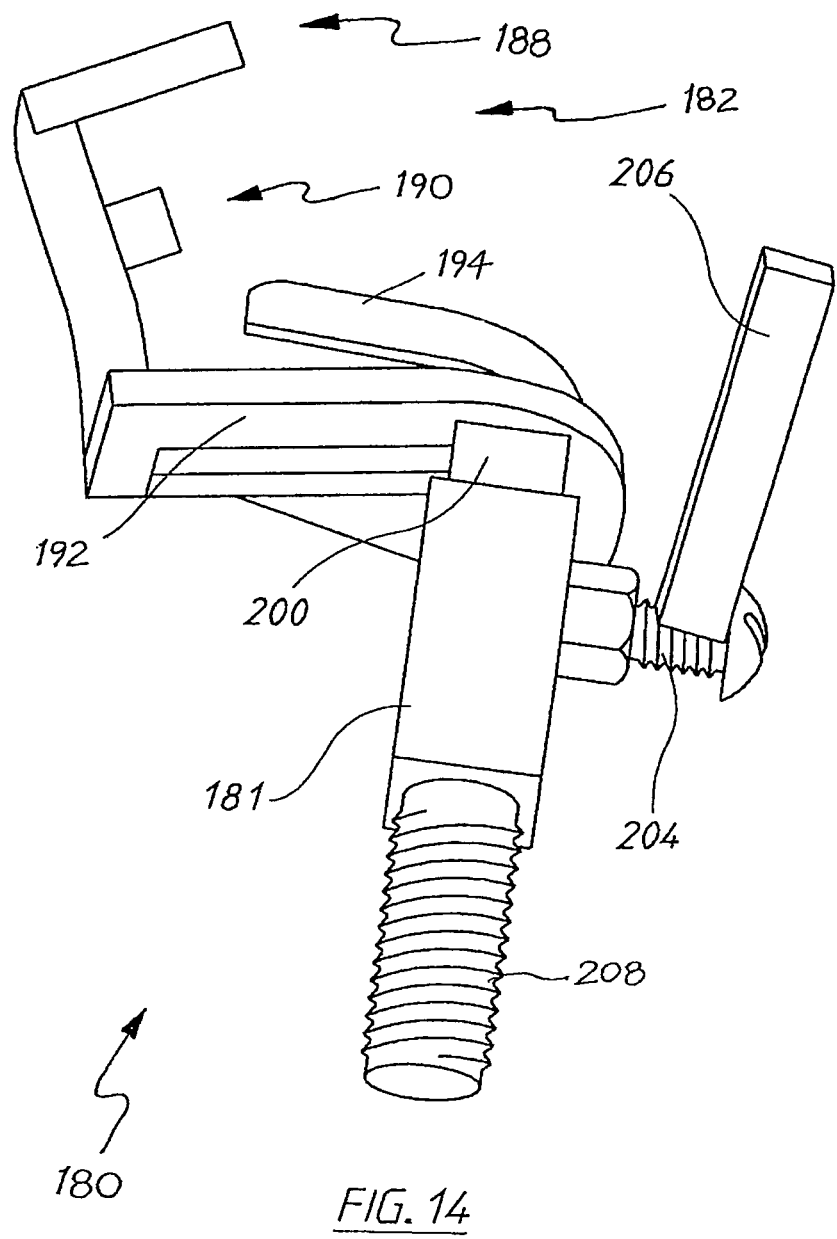
FIG. 14 is a side view of the apparatus of FIG. 13.
Figure 15:
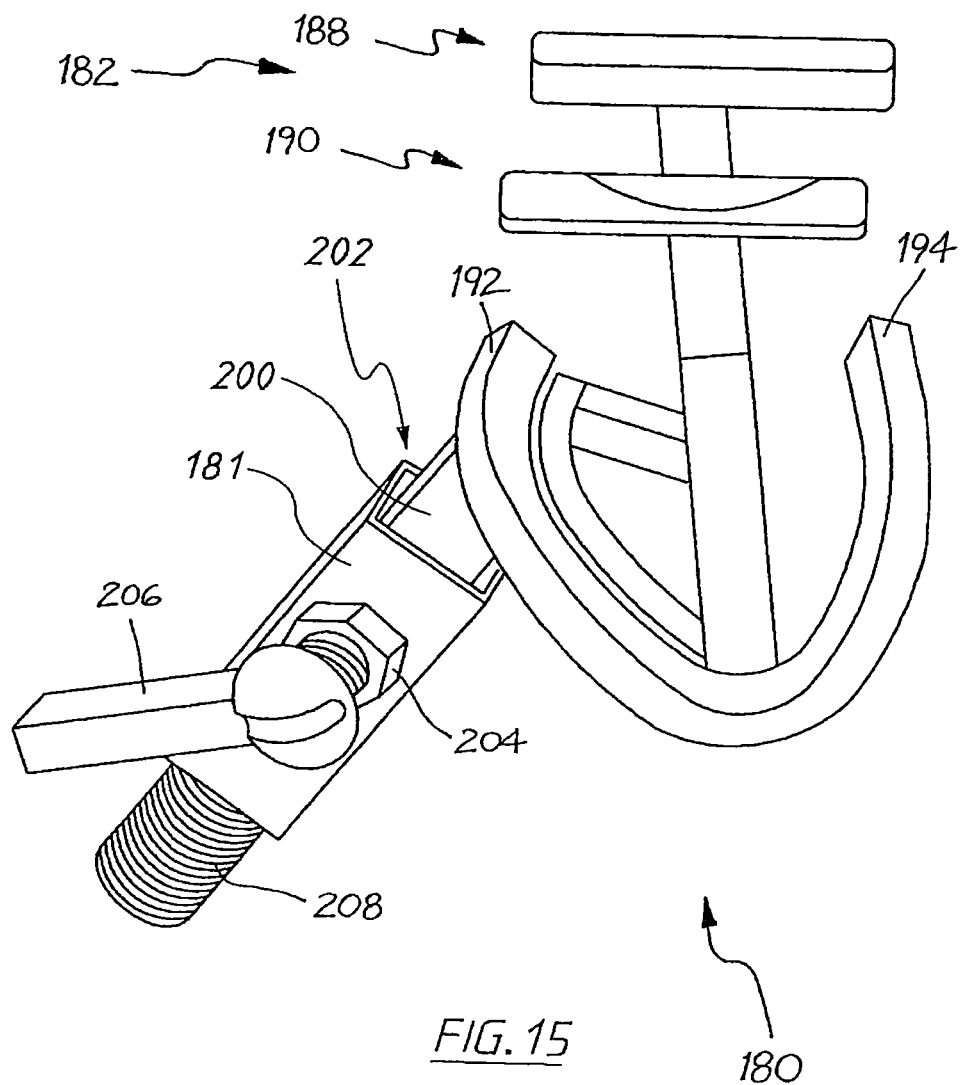
FIG. 15 is a front view of the apparatus of FIG. 13.

The apparatus 180 shown in FIGS. 13 to 15 comprises a body 181 to which is connected a single shucking head 182 having oyster supporting means and oyster wedging means. The oyster supporting means includes two support members 184, 186 and the oyster wedging means includes an arrangement of wedging members 188, 190.

The support members 184, 186 comprise spaced apart arms 192, 194 having generally parallel arm portions adapted to support the lower shell of an oyster at respective opposed sides thereof.

The wedging members 188, 190 comprise spaced apart protrusion surfaces adapted to wedge the end of an oyster against a selected one of the protrusion surfaces.

The arrangement of supporting arms 192, 194 and wedging protrusion surfaces is such that an oyster is held in a stable position to allow a person to use a knife to shuck the oyster with one hand.

The position of the shucking head 182 relative to the body 181 (and hence to the mounting assembly) may be adjusted by a slidable connection so as to accommodate the hand position of the person shucking the oyster or to accommodate differently constructed knives. The slidable connection includes a slide bar 200 which is secured to the shucking head 182 and can slidably engage within a passageway 202 in the body 181. There is a positioning device 204 which is operably connected to a screw tightening member 206 that can tighten and untighten the device 204 against the slide bar 200 (and hence against the shucking head) to a selected position relative to the body 181.

Secured to the rear of the body 181 is a threaded shaft 208, to which can be releasably connected a linkage limb of the mounting assembly.

Figure 16:
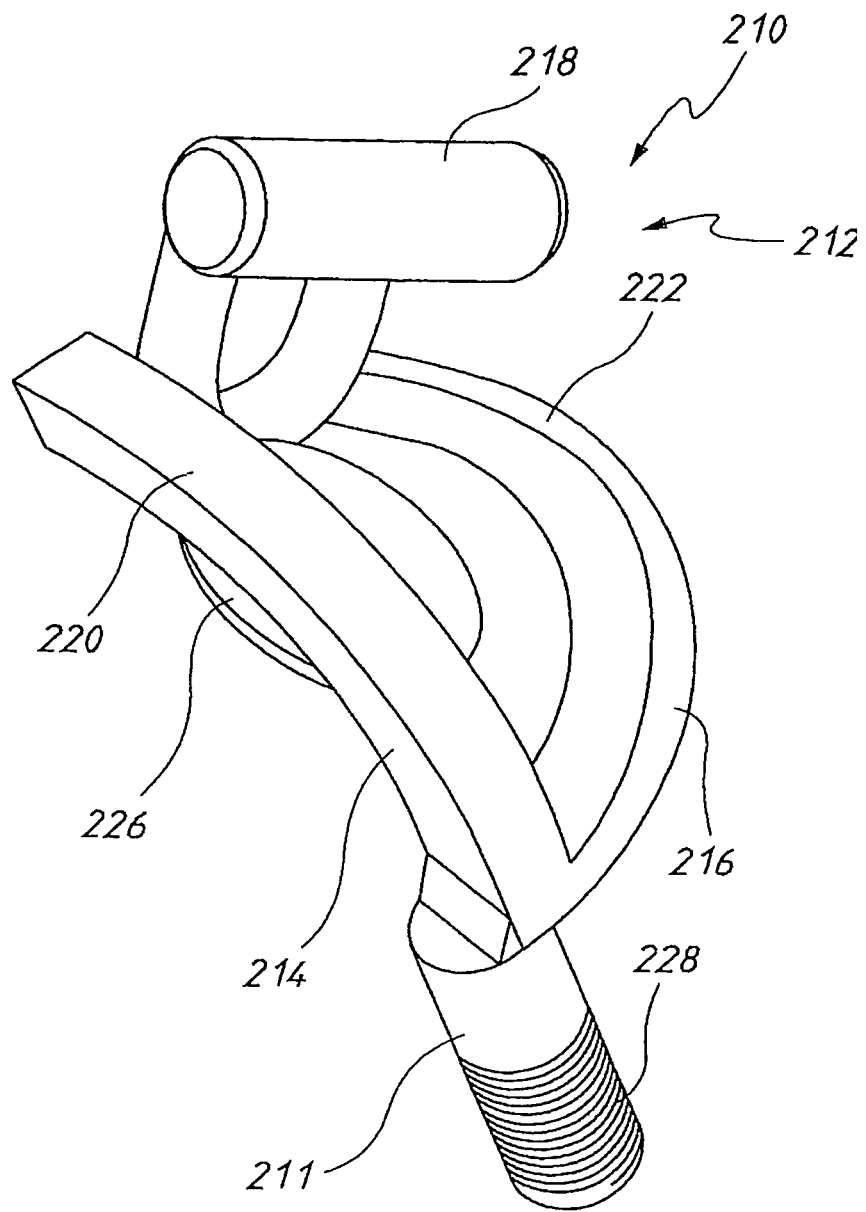
FIG. 16 is a perspective view of an oyster shucking apparatus according to a sixth preferred embodiment of the invention.
Figure 17:
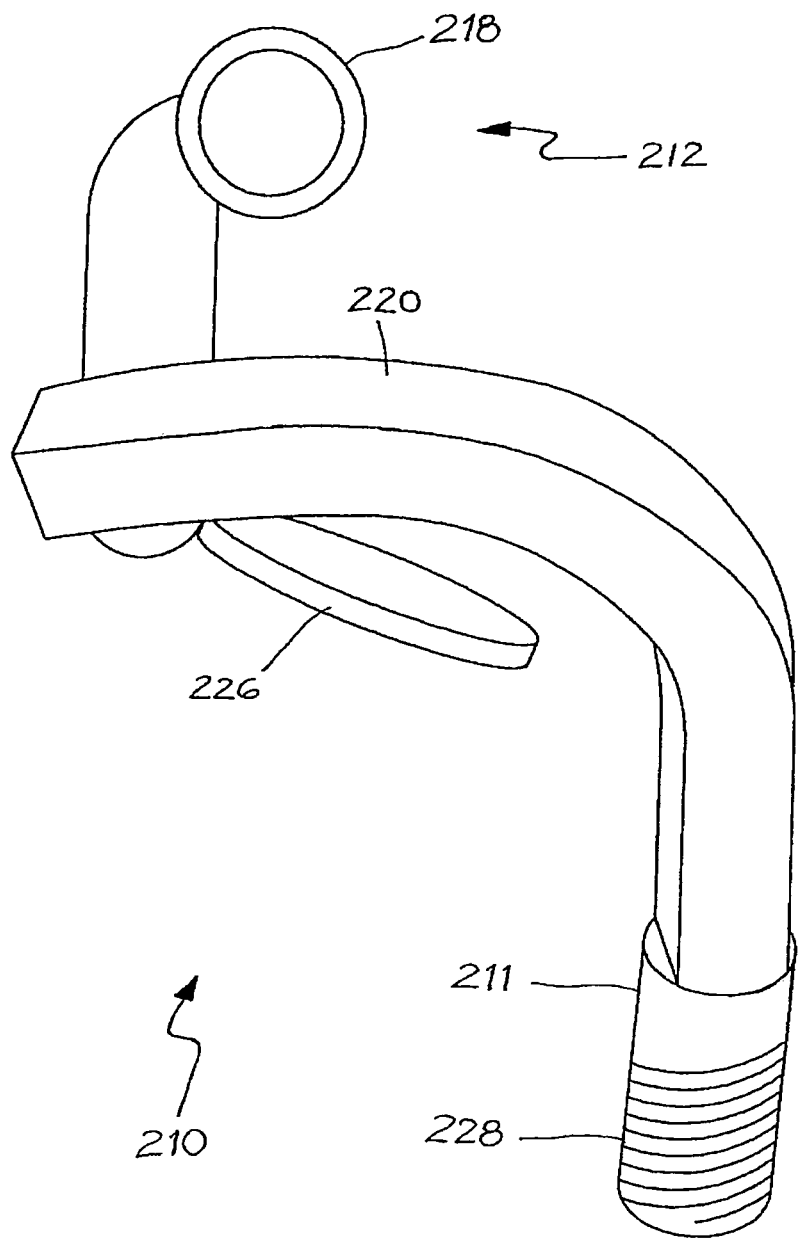
FIG. 17 is a side view of the apparatus of FIG. 16.
Figure 18:
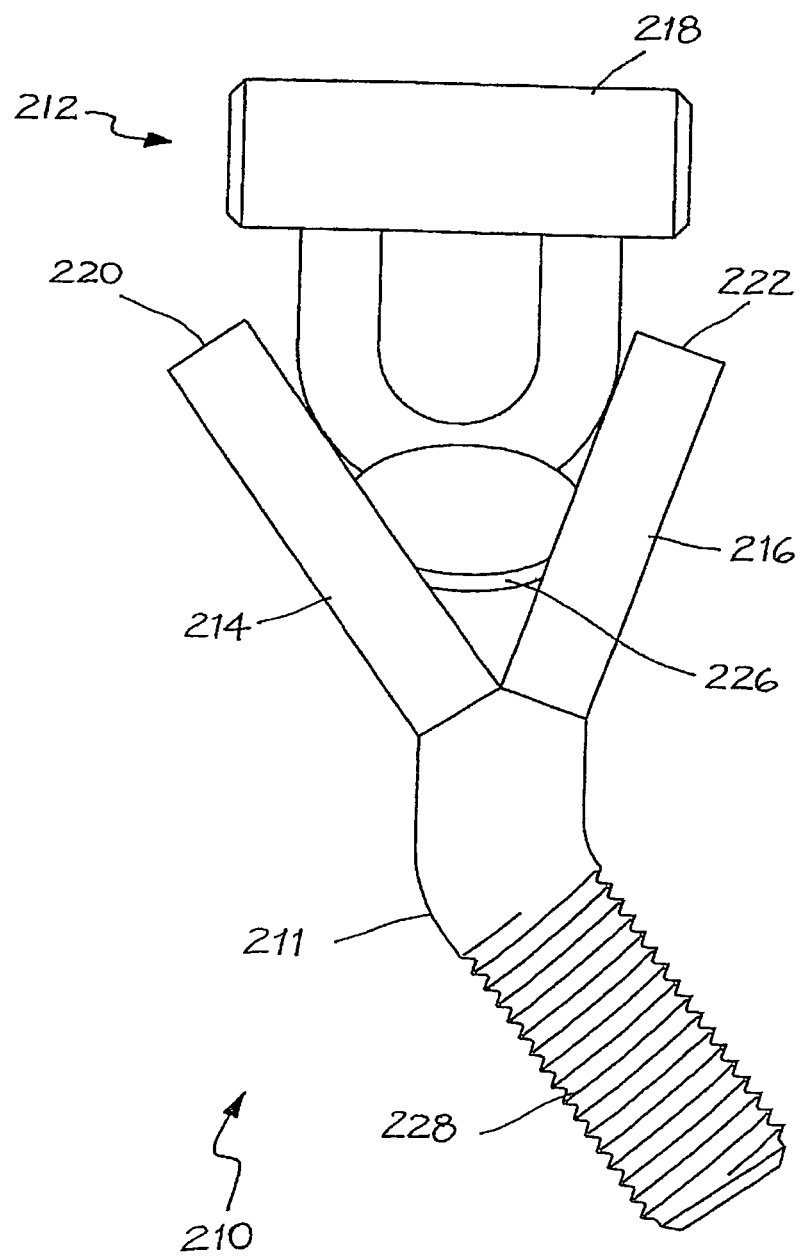
FIG. 18 is a front view of the apparatus of FIG. 16.

The apparatus 210 shown in FIGS. 16 to 18 comprises a body 211 to which is connected a single shucking head 212 having oyster supporting means and oyster wedging means. The oyster supporting means includes two support members 214, 216 and the oyster wedging means includes a wedging member 218.

The support members 214, 216 comprise spaced apart arms 220, 222 having bow shaped arm portions adapted to support the lower shell of an oyster at respective opposed sides thereof.

The wedging member 218 comprises a protrusion surface adapted to wedge the end of an oyster thereagainst.

Secured to the bottom of the wedging means is a platform 226 that may be used for supporting the underside of an oyster, if necessary.

The arrangement of supporting arms 220, 222 and wedging protrusion surface, and supporting platform 226 if necessary, is such that an oyster is held in a stable position to allow a person to use a knife to shuck the oyster with one hand.

The body 211 has a threaded shaft 228 to which can be releasably connected a linkage limb of the mounting assembly.

Figure 19:
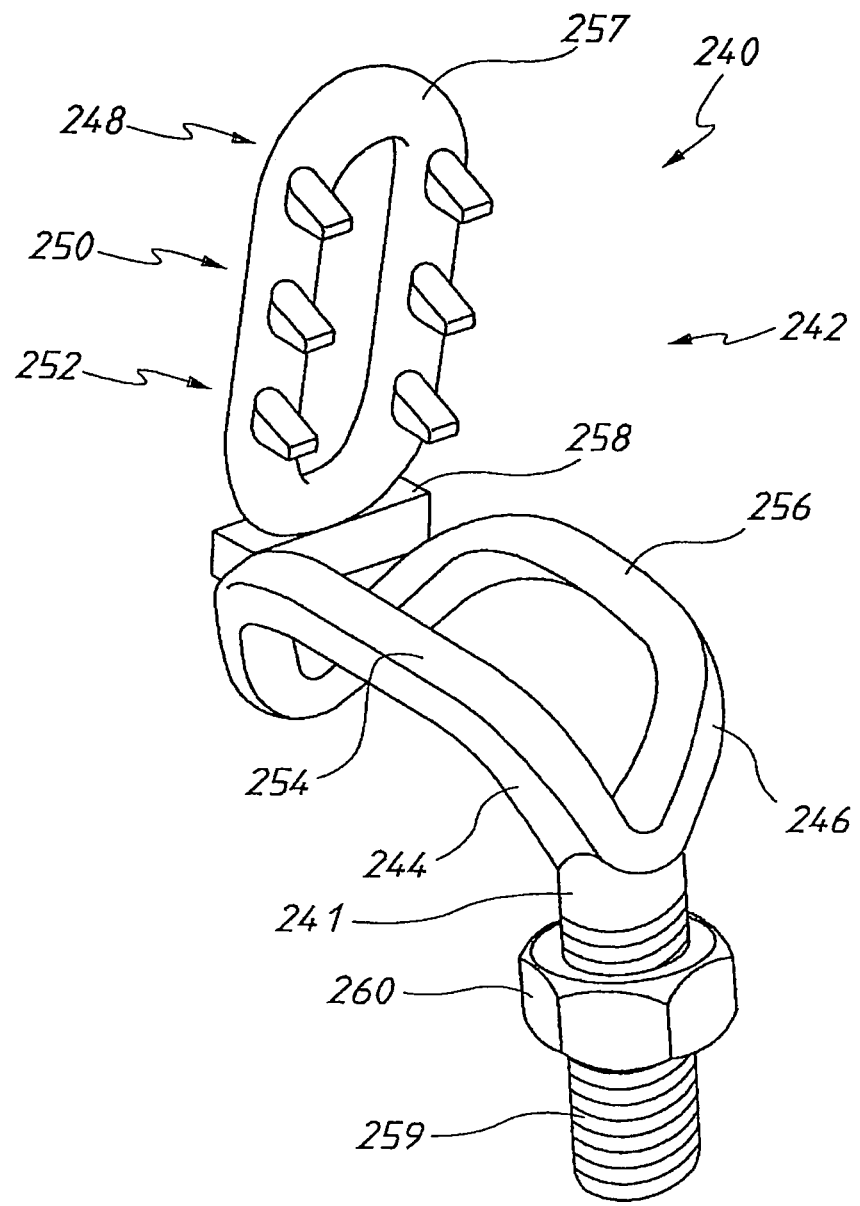
FIG. 19 is a perspective view of an oyster shucking apparatus according to a seventh preferred embodiment of the invention.
Figure 20:
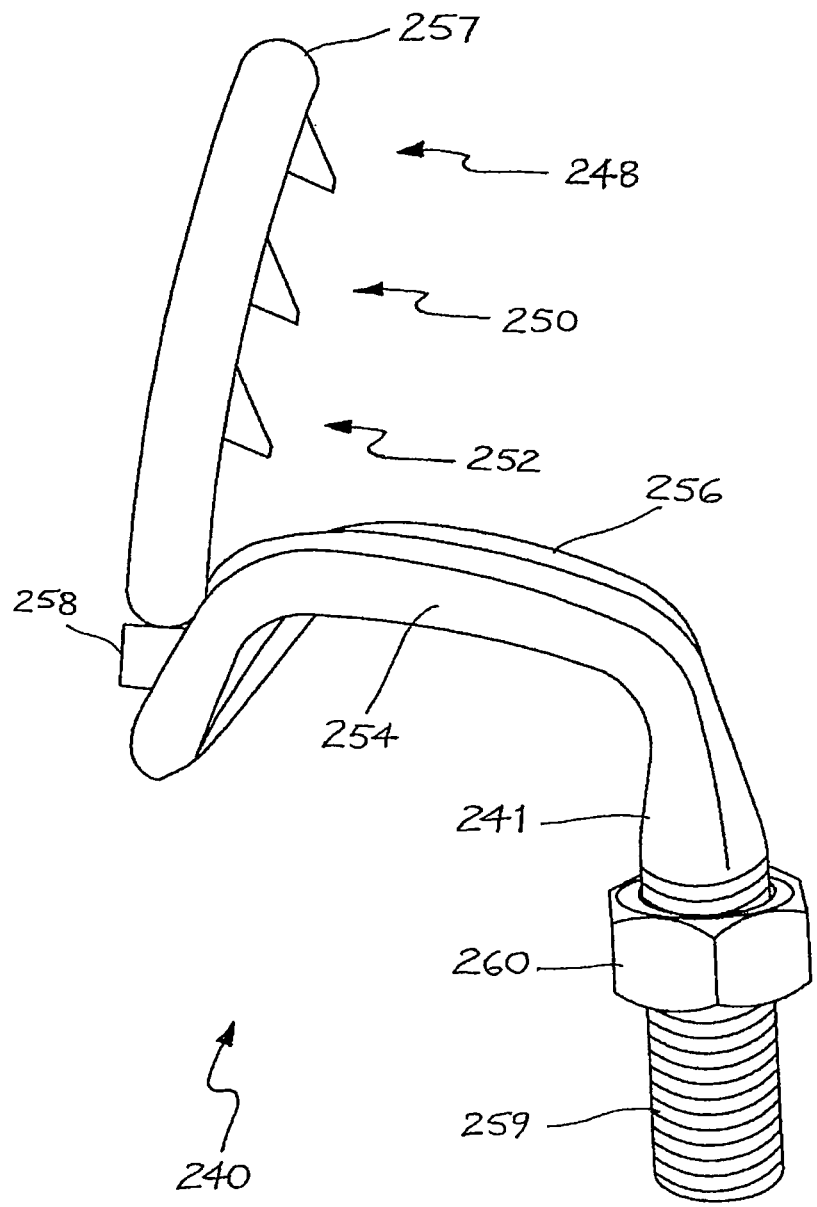
FIG. 20 is a side view of the apparatus of FIG. 19.
Figure 21:
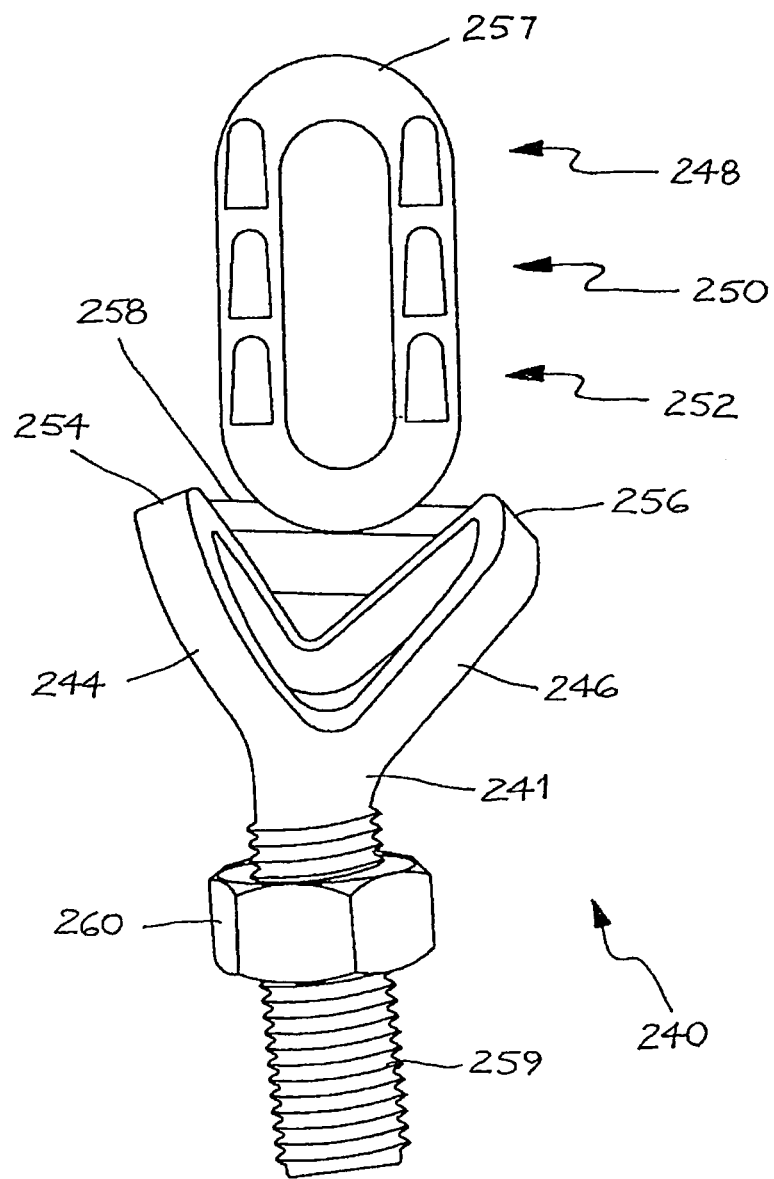
FIG. 21 is a front view of the apparatus of FIG. 19.

The apparatus 240 shown in FIGS. 19 to 21 comprises a body 241 to which is connected a single shucking head 242 having oyster supporting means and oyster wedging means. The oyster supporting means includes two support members 244, 246 and the oyster wedging means includes an arrangement of wedging members 248, 250, 252.

The support members 244, 246 comprise spaced apart arms 254, 256 joined at their rear and having generally parallel arm portions adapted to support the lower shell of an oyster at respective opposed sides thereof. The wedging members 248, 250, 252 comprise respective pairs of spaced apart protrusions in the form of teeth having surfaces adapted to wedge the end of an oyster against a selected pair of the protrusion surfaces.

The teeth are secured to a wedging support stand 257, the bottom of which is secured to a base 258 that is, in turn, secured to the rear of the support members 244, 246.

The arrangement of supporting arms 254, 256 and wedging protrusion surfaces in the form of teeth 248, 250, 252 is such that an oyster is held in a stable position to allow a person to use a knife to shuck the oyster with one hand.

The body 241 has a threaded shaft 259 with nut 260, to which can be releasably connected a linkage limb of the mounting assembly.

Figure 22:
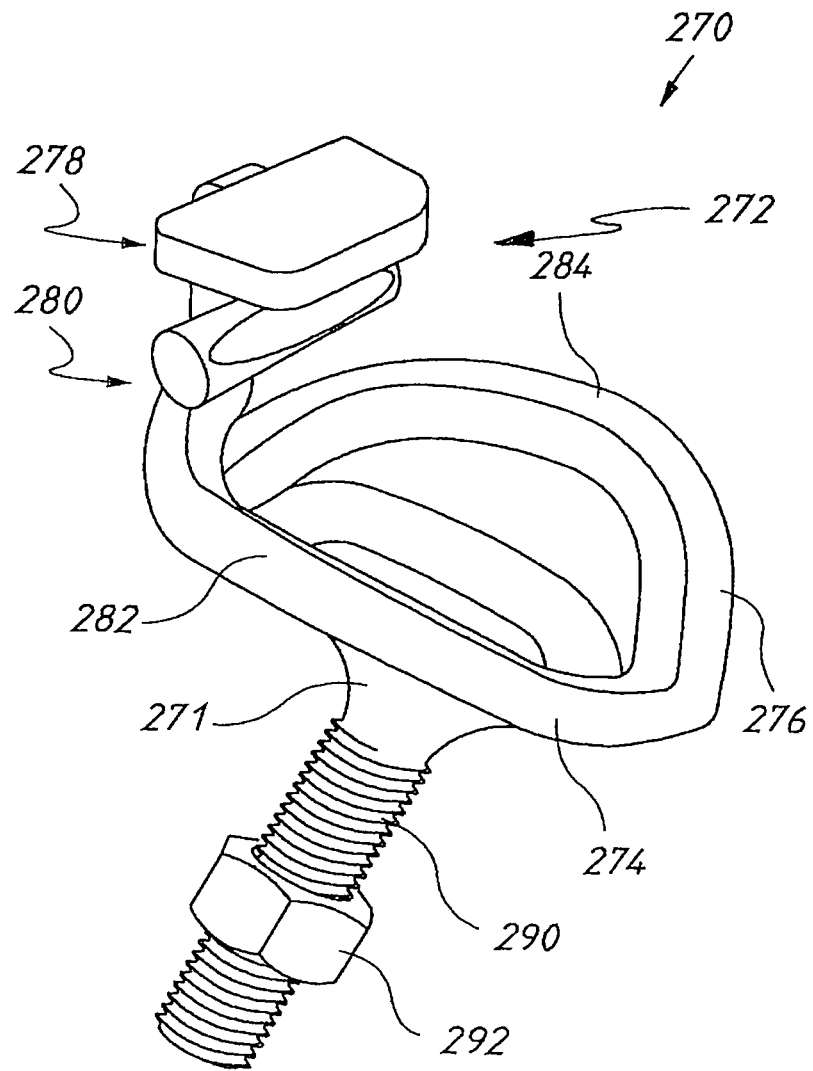
FIG. 22 is a perspective view of an oyster shucking apparatus according to an eighth preferred embodiment of the invention.
Figure 23:
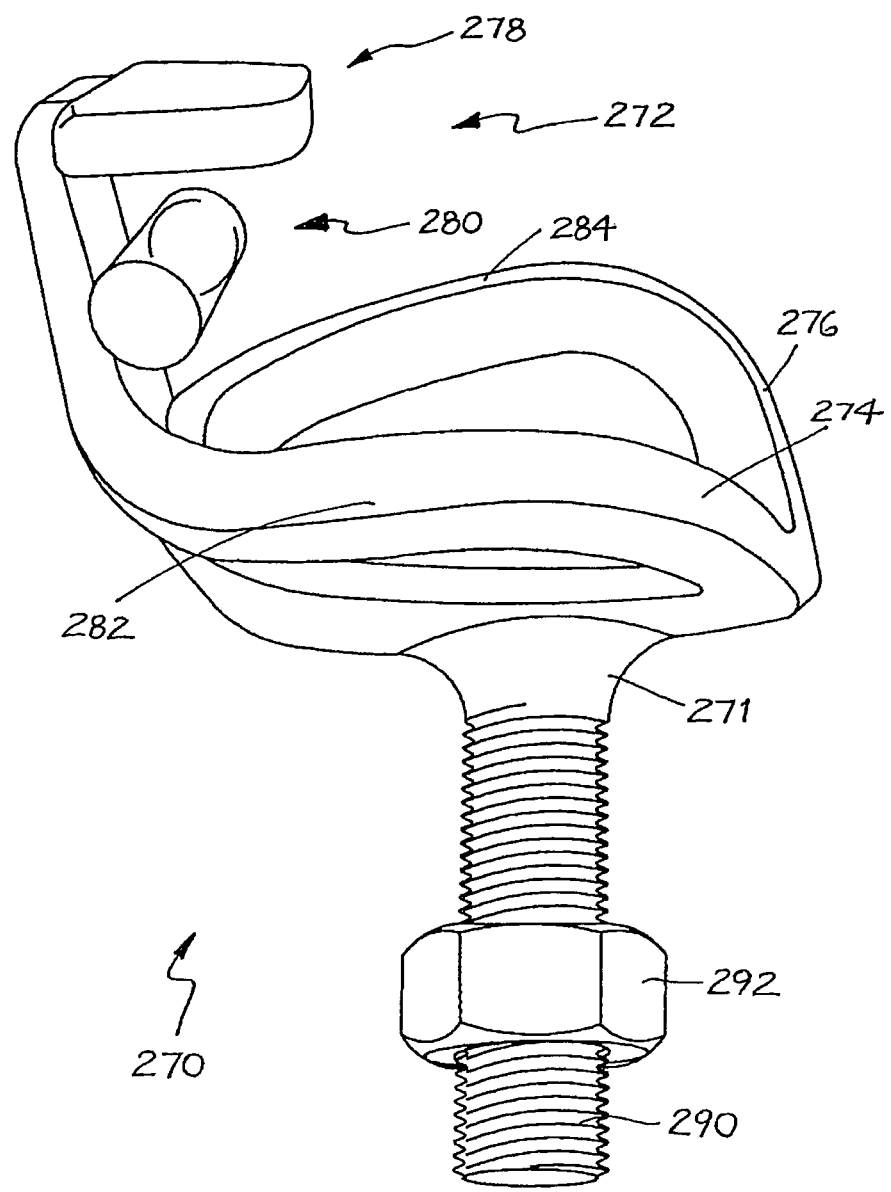
FIG. 23 is a side view of the apparatus of FIG. 22.
Figure 24:
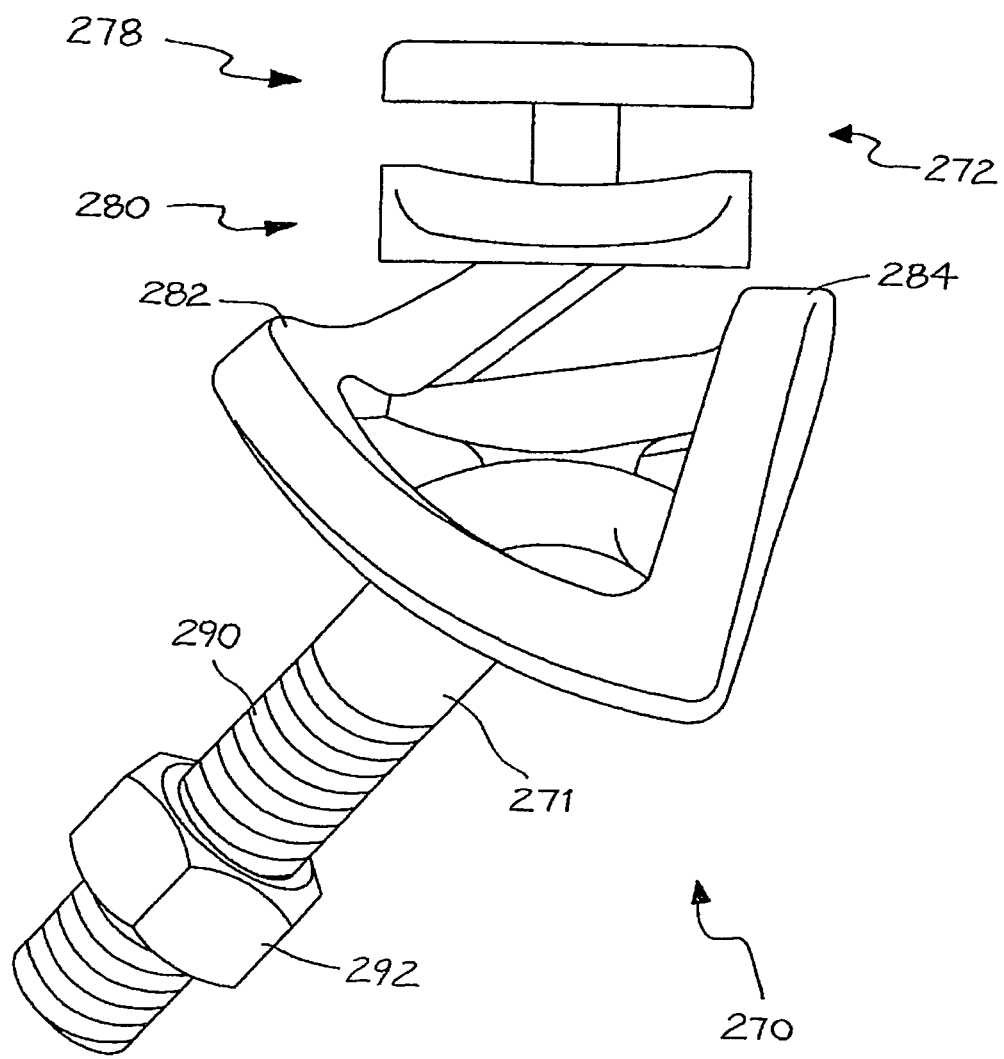
FIG. 24 is a front view of the apparatus of FIG. 22.

The apparatus 270 shown in FIGS. 22 to 24 comprises a body 271 to which is connected a single shucking head 272 having oyster supporting means and oyster wedging means. The oyster supporting means includes two support members 274, 276 and the oyster wedging means includes an arrangement of wedging members 278, 280.

The support members 274, 276 comprise spaced apart arms 282, 284 joined at their rear end and having bow shaped arm portions adapted to support the lower shell of an oyster at respective opposed sides thereof.

The wedging members 278, 280 comprise spaced apart protrusion surfaces adapted to wedge the end of an oyster against a selected one of the protrusion surfaces.

The arrangement of supporting arms 282, 284 and wedging protrusion surfaces is such that an oyster is held in a stable position to allow a person to use a knife to shuck the oyster with one hand.

The body 271 has a threaded shaft 290 with nut 292, to which can be releasably connected a linkage limb of the mounting assembly.

Figure 25:
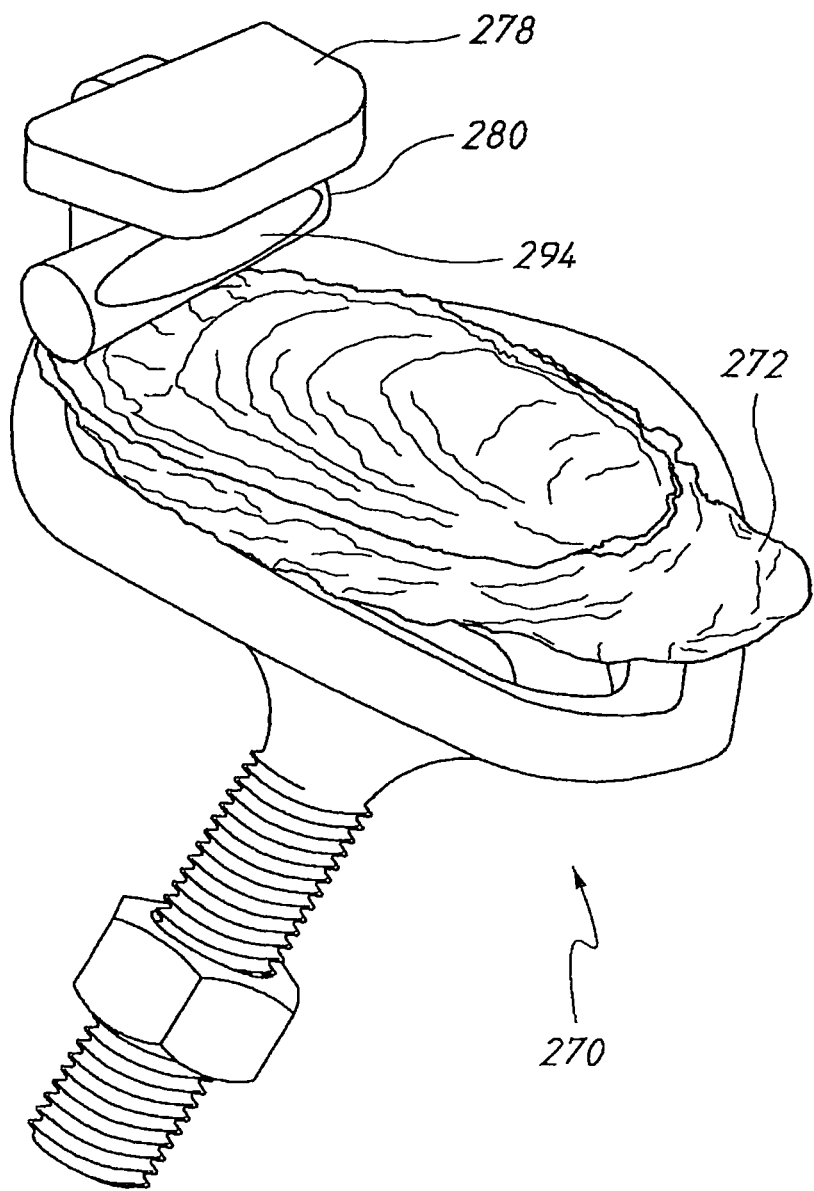
FIG. 25 is a perspective view of the apparatus of FIGS. 22 to 24 holding a generally straight oyster in a stable position.
Figure 26:
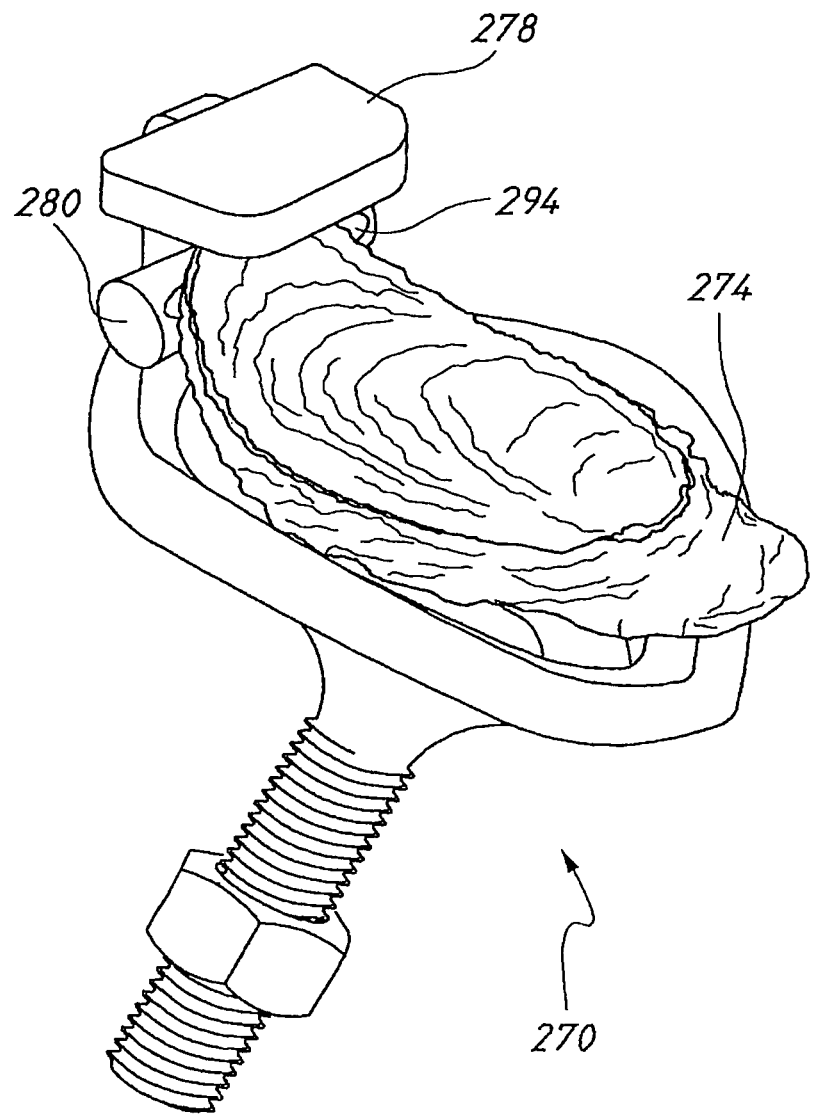
FIG. 26 is a perspective view of the apparatus of FIGS. 22 to 24 holding a generally curved oyster in a stable position.

The apparatus 270 is again shown in FIGS. 25 and 26 holding respective oysters 272, 274 in a stable position to allow a person to use a knife to shuck an oyster with one hand.

The oysters 272, 274 are of different shape, with oyster 272 shown in FIG. 25 being generally straight and oyster 274 shown in FIG. 26 being generally curved.

The generally straight oyster 272 has its end wedged against the underside surface of the lower wedging member 280, which comprises a protrusion surface in the form of a cylindrical bar.

The generally curved oyster 274 has its end wedged against the underside surface of the upper wedging member 278, which comprises a protrusion surface in the form of a panel, and when pressing on a curved indentation 294 formed in the cylindrical bar beneath the panel.

FIGS. 27 to 30 show a knife 300 being used at various steps of a process for shucking the oyster 272 held stably by the apparatus 270.

Figure 27:
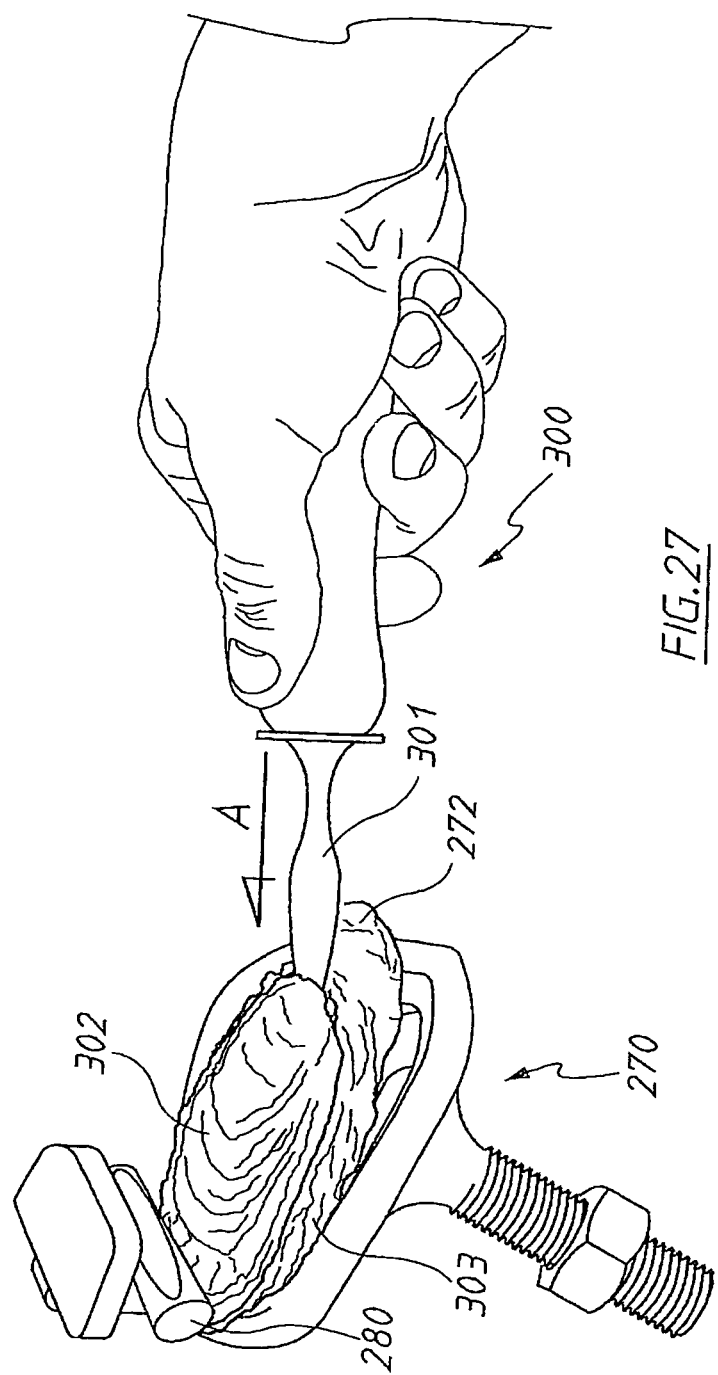
FIG. 27 is a perspective view of the apparatus and oyster of FIG. 25 with a knife being used in a first step of a process for shucking the oyster.

A person holds the knife 300 in one hand and pushes the tip of the knife blade 301 into the valve between the upper and lower shells 302, 303 of the oyster in the direction of arrow A, thereby penetrating the weakest point of the oyster (see FIG. 27).

Figure 28:
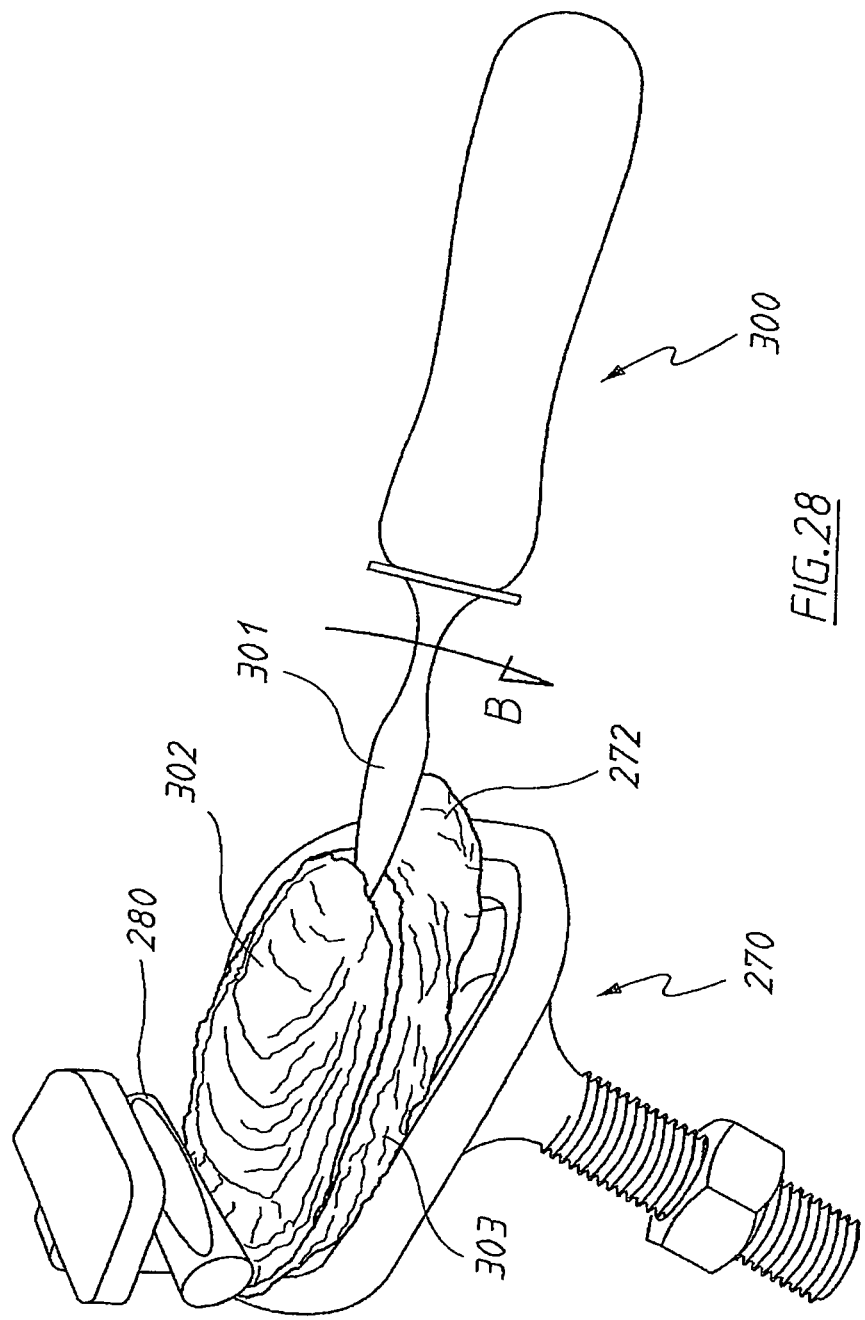
FIG. 28 is a similar view to FIG. 27 with the knife being used in a second step of a process for shucking the oyster.

The blade 301 of the knife is then pushed down in the direction of arrow B, thereby partly separating the upper and lower shells of the oyster (see FIG. 28).

Figure 29:
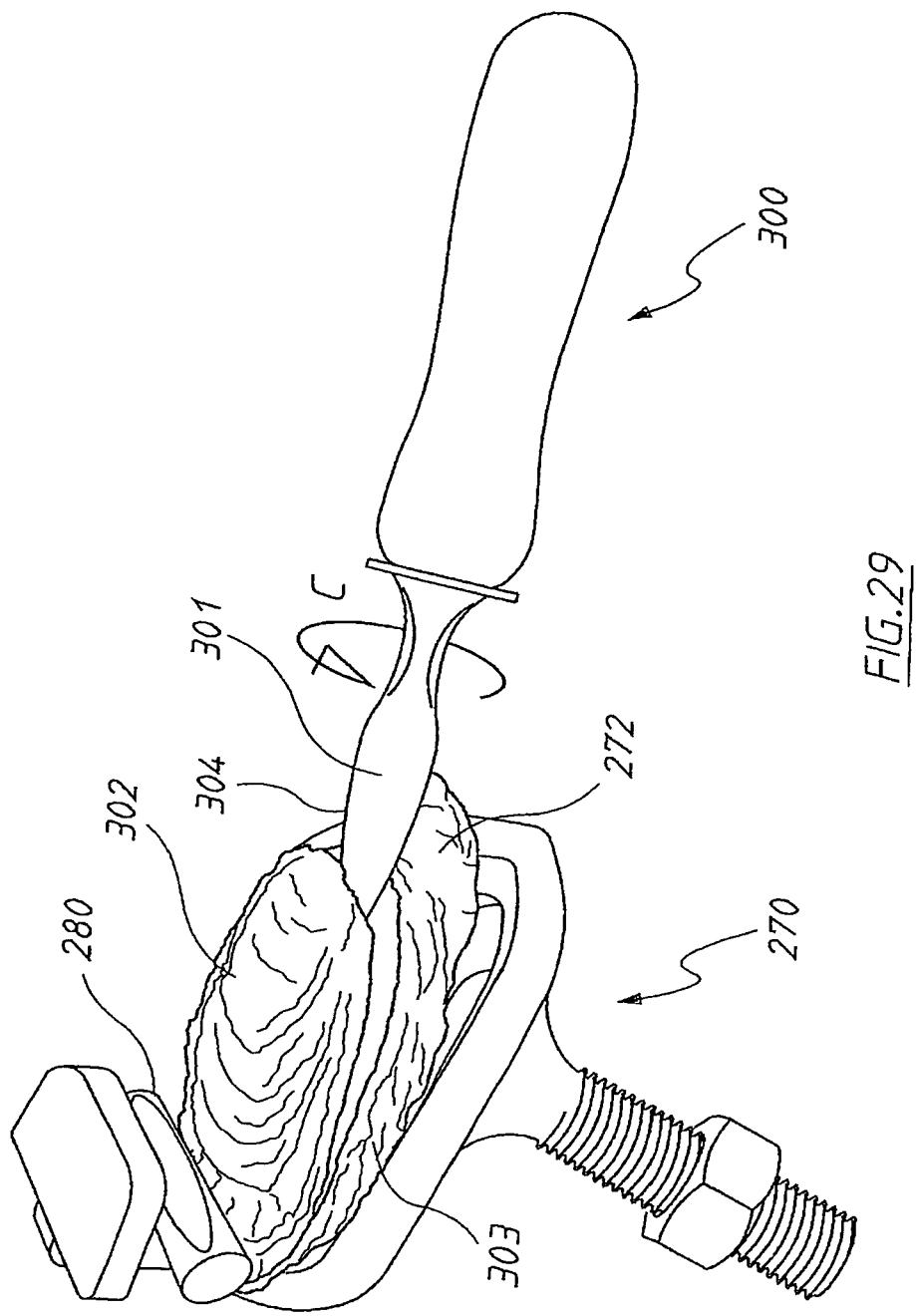
FIG. 29 is a similar view to FIG. 28 with the knife being used in a third step of a process for shucking the oyster.
Figure 30:
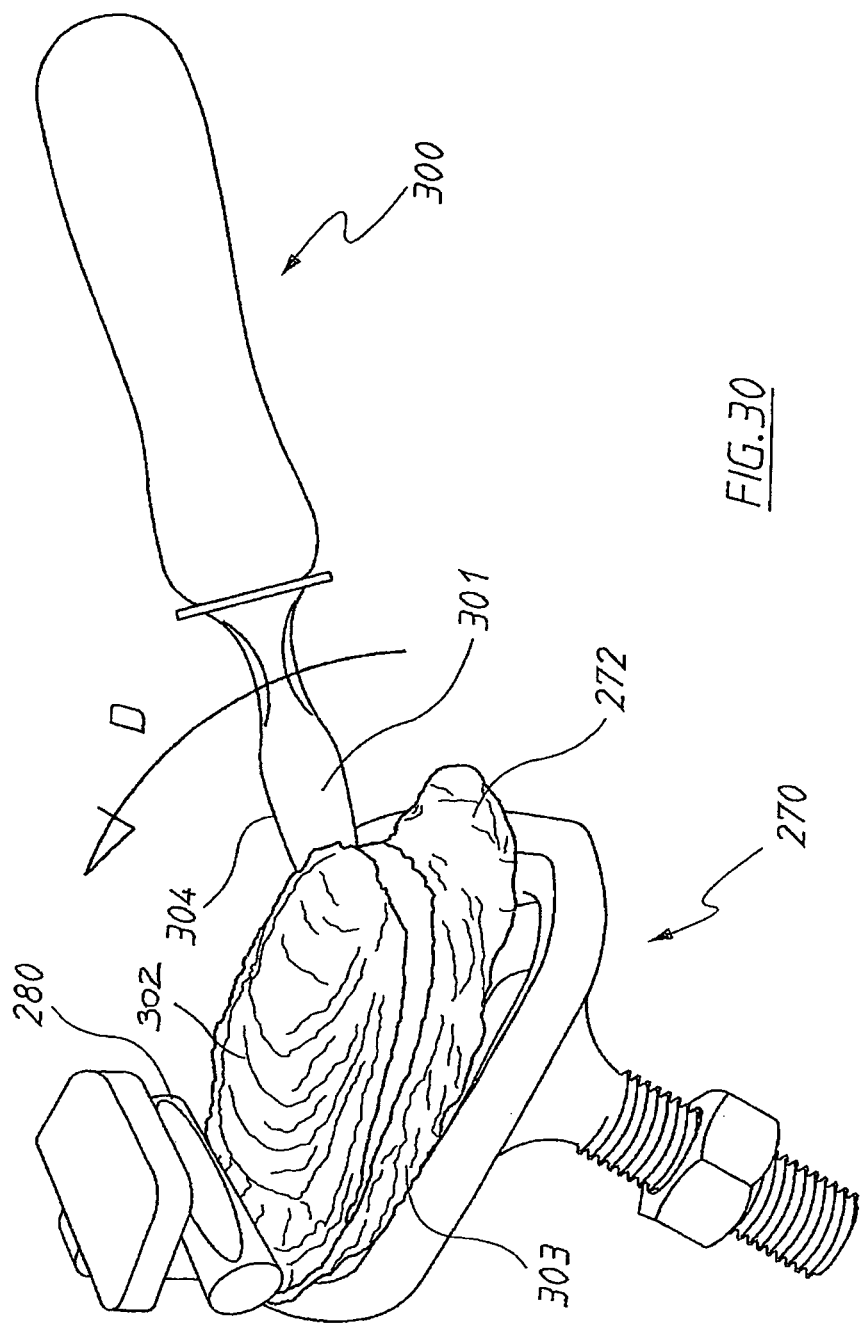
FIG. 30 is a similar view to FIG. 29 with the knife being used in a fourth step of a process for shucking the oyster.

Further separation of the shells is achieved by then twisting the blade 301 of the knife in a direction of arrow C, so as to locate a cutting edge 304 of the blade uppermost and in a leading position against the upper shell of the oyster (see FIG. 29).

The blade 301 is then swept rearwardly along the inside of the oyster between the shells in the direction of arrow D to cause the cutting edge 304 of the blade to sever the muscle holding the shells together, whereby the oyster is opened.

A stream or spray of water is allowed to dispense over the hand, knife and opened oyster to remove any shell debris that may contaminate the finished product.

Figure 31:
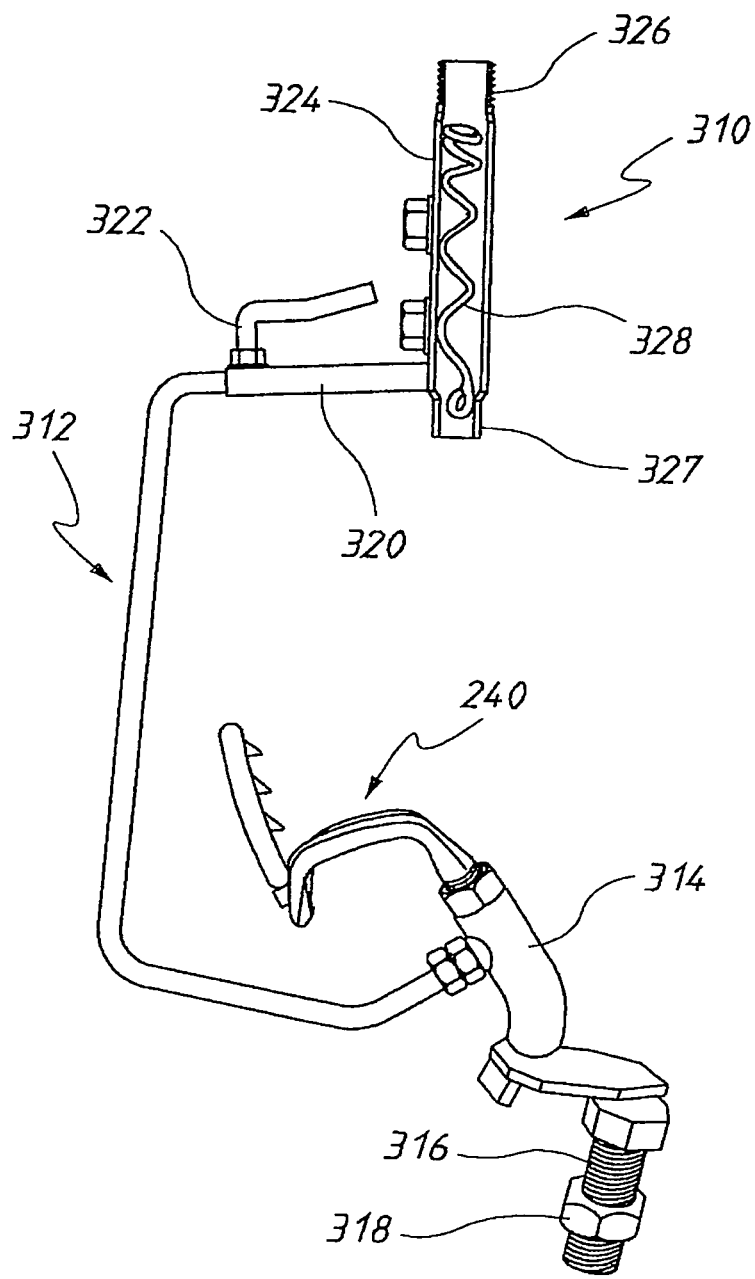
FIG. 31 is a side view of an assembly including the oyster shucking apparatus of FIGS. 19 to 21 connected to a water dispensing device.
Figure 32:
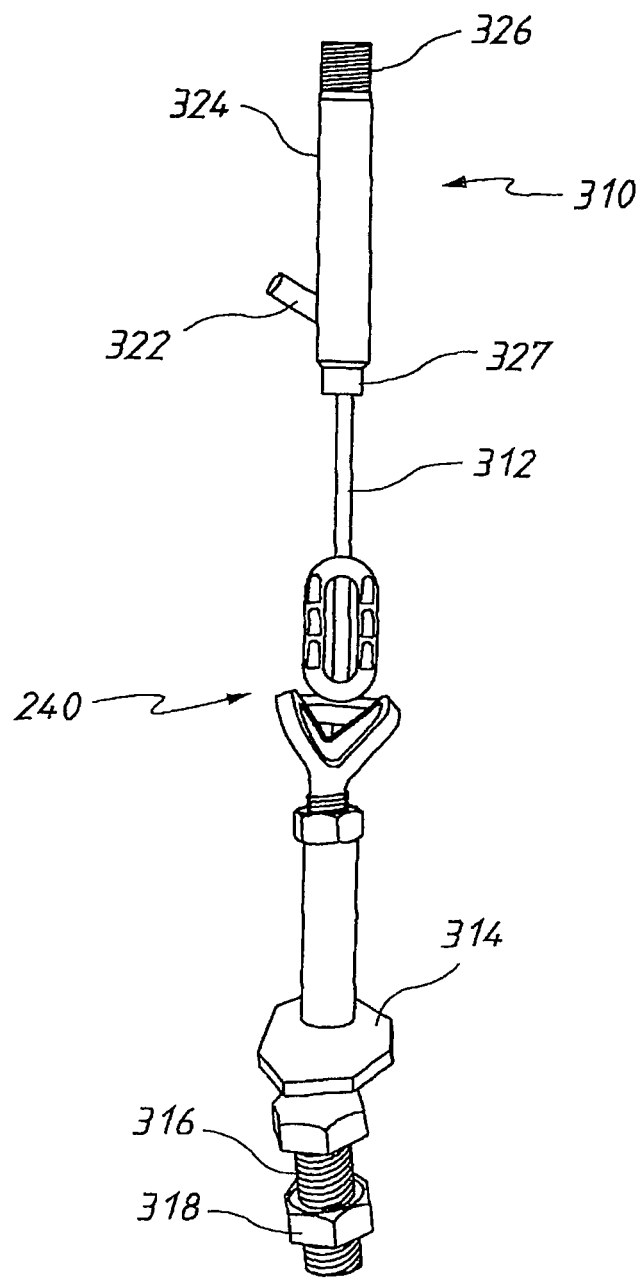
FIG. 32 is a front view of the assembly shown in FIG. 31.

FIGS. 31 and 32 show a water sprayer 310 and its holder 312 connected via an adaptor 314 to apparatus 240. The adapter 314 includes a threaded shaft 316 with nut 318, to which can be releasably connected a mounting assembly.

The water sprayer 310 has an adjustable tubular connector 320 that slidably receives an upper part of the holder 312 and can be tightly engaged thereto by operation of a screw tightening member 322. The position of the tubular connector 320 (and hence the position of the water sprayer 310) can be adjusted for selecting the direction of the water.

The water sprayer 310 also has a main pipe 324, shown sectionally in FIG. 31 that has a threaded upper portion 326 for screw engagement to an outlet from a water source, and a reduced diameter lower portion 327 through which the water is released. A generally helical strand 328 of a non-corrosive metal or like material is located tightly within the main pipe 324. The strand 328 is so shaped that it effectively "softens" the water passing through the pipe 324 so that the water released therefrom is not so violent or concentrated as to upset the effective removal of shell debris or otherwise diminish the quality of the opened oyster.

It will be readily apparent to persons skilled in the art that various modifications may be made in details of design, construction and use of the oyster shucking apparatus described above without departing from the scope or ambit of the present invention.

I claim:

1. An apparatus for shucking oysters comprising one or more shucking head adapted to be mounted on a mounting assembly, the or each shucking head including means for supporting the oyster in a position so that a lower shell of the oyster is supported on one or more support member, and means for wedging the oyster in a position so that an end of the oyster is wedged against one or more wedging member, the arrangement of supporting means and wedging means being such that the oyster is held in a stable position to allow a person to use a knife to shuck the oyster with one hand, wherein there is one wedging member having a protrusion surface.

2. The apparatus of claim 1 wherein there are two support members comprising spaced apart arms, the lower shell of the oyster being supported by the arms at respective opposed sides thereof.

3. The apparatus of claim 2 and including means for adjusting the position of at least one of the arms so as to accommodate differently sized and shaped oysters.

4. The apparatus of claim 3 wherein the arm position adjusting means comprises a rotatable connection that allows the position of one arm to be rotatably adjusted relative to the position of the other arm.

5. The apparatus of claim 3 wherein the arm position adjusting means comprises a slidable connection that allows the position of both arms to be slidably adjusted relative to the position of the wedging means.

6. The apparatus of claim 1 wherein there are a plurality of wedging members comprising spaced apart protrusion surfaces, the end of the oyster being wedged against a selected one of the protrusion surfaces.

7. The apparatus of claim 6 or and including means for adjusting the position of the or each protrusion surface so as to accommodate differently sized and shaped oysters.

8. The apparatus of claim 7 wherein the protrusion position adjusting means comprises a slid able connection that allows the position of the or each protrusion surface to be slidably adjusted relative to the position of the or each supporting member.

9. The apparatus of claim 1 wherein there are a plurality of shucking heads forming a multihead, and each shucking head has a pair of support members that are spaced apart from each other and from the or each wedging member by a different distance to that of the or each other shucking head, and the apparatus includes means for adjusting the position of the multihead so as to allow a selected one of the shucking heads to hold the oyster in a stable position.

10. The apparatus of claim 9 wherein the multihead position adjusting means comprises a rotatable connection that allows the position of the multihead to be rotatably adjusted relative to the position of the mounting assembly.

11. The apparatus of claim 1 wherein the mounting assembly includes an upright post having a nut fastened at its uppermost end, and a linkage limb having a threaded member received by the nut, the linkage limb being adapted to orientate the one or more shucking head in a stable position.

12. A process of shucking oysters, comprising:
 (a) providing an oyster shucking apparatus, comprising one or more shucking head adapted to be mounted on a mounting assembly, the or each shucking head including means for supporting the oyster in a position so that a lower shell of the oyster is supported on one or more support member, and means for wedging the oyster in a position so that an end of the oyster is wedged against one or more wedging member, the arrangement of supporting means and wedging means being such that the oyster is held in a stable position to allow a person to use a knife to shuck the oyster with one hand, wherein there is one wedging member having a protrusion surface,
 (b) mounting the apparatus on a mounting assembly,
 (c) positioning an oyster to be shucked on the apparatus so that a lower shell of the oyster is supported on one or more support member of the apparatus and so that an end of the oyster is wedged against one or more wedging member of the apparatus, whereby the oyster is held in a stable position, and
 (d) using a knife to shuck the oyster with one hand.

13. An apparatus for shucking oysters comprising one or more shucking head adapted to be mounted on a mounting assembly, the or each shucking head including means for supporting the oyster in a position so that a lower shell of the oyster is supported on one or more support member, and means for wedging the oyster in a position so that an end of the oyster is wedged against one or more wedging member, the arrangement of supporting means and wedging means being such that the oyster is held in a stable position to allow a person to use a knife to shuck the oyster with one hand, wherein there is one shucking head, and the apparatus includes connector means for adjusting the position of the shucking head relative to the mounting assembly so as to accommodate the hand position of the person shucking the oyster or to accommodate differently constructed knives.

14. An apparatus for shucking oysters comprising one or more shucking head adapted to be mounted on a mounting assembly, the or each shucking head including means for supporting the oyster in a position so that a lower shell of the oyster is supported on one or more support member, means for wedging the oyster in a position so that an end of the oyster is wedged against one or more wedging member, the arrangement of supporting means and wedging means being such that the oyster is held in a stable position to allow a person to use a knife to shuck the oyster with one hand, and means for locating a water dispensing device over the or each shucking head.

15. An oyster shucking apparatus for shucking oysters where each oyster has upper and lower shells and opposite ends, said apparatus mountable to a mounting assembly, said oyster shucking apparatus comprising:
 a. a body part having a front surface, and
 b. an oyster shucking head, comprising:
  i. a support member mounted on said body part and extending forward thereof for supporting said lower shell of an oyster, with one end of said oyster oriented toward said body part, and
  ii. a wedging member mounted on said body part at an elevation above said support member and having a protruding surface extending in the forward direction therefrom, said wedging member being movable vertically to engage, releasably secure and wedge said oyster against said support member,
 said support member and said wedging member being cooperative such that the oyster can be held in a stable position to allow a person to use a knife to shuck the oyster with one hand.

16. An apparatus for shucking oysters comprising:
 a. a body part,
 b. at least one shucking head adapted to be mounted to said body part, said shucking head including:

i. at least one support member for supporting an oyster in a position so that a lower shell of the oyster is supported on said at least one support member, and ii. at least one wedging member having a protrusion surface extending forward of said body part for wedging the oyster in a position so that an end of the oyster is wedged against said at one wedging member, the arrangement of supporting means and wedging means being such that the oyster can be held in a stable position to allow a person to use a knife to shuck the oyster with one hand.

* * * * *